US010656306B2

(12) United States Patent
Forbes et al.

(10) Patent No.: US 10,656,306 B2
(45) Date of Patent: May 19, 2020

(54) SYSTEM AND METHODS FOR IMPROVING THE ACCURACY OF SOLAR ENERGY AND WIND ENERGY FORECASTS FOR AN ELECTRIC UTILITY GRID

(71) Applicant: THE CATHOLIC UNIVERSITY OF AMERICA, Washington, DC (US)

(72) Inventors: Kevin F. Forbes, Silver Spring, MD (US); Ernest M. Zampelli, Ellicot City, MD (US)

(73) Assignee: The Catholic University of America, Washington, DC (US)

( * ) Notice: Subject to any disclaimer, the term of this patent is extended or adjusted under 35 U.S.C. 154(b) by 628 days.

(21) Appl. No.: 15/600,020

(22) Filed: May 19, 2017

(65) Prior Publication Data

US 2017/0336534 A1 Nov. 23, 2017

Related U.S. Application Data

(60) Provisional application No. 62/338,881, filed on May 19, 2016.

(51) Int. Cl.
*G01W 1/10* (2006.01)
*G06N 20/00* (2019.01)
(Continued)

(52) U.S. Cl.
CPC .............. *G01W 1/10* (2013.01); *G06F 16/23* (2019.01); *G06F 17/10* (2013.01); *G06F 17/18* (2013.01);
(Continued)

(58) Field of Classification Search
CPC ....................................................... G01W 1/10
(Continued)

(56) References Cited

U.S. PATENT DOCUMENTS 8,600,572 B2 12/2013 Sri-Jayantha
8,620,634 B2 12/2013 Foslien Graber et al.
(Continued)

OTHER PUBLICATIONS

Jebaraj, S., and S. Iniyan. "A review of energy models." Renewable and sustainable energy reviews 10.4 (2006): 281-311. (Year: 2006).*
(Continued)

*Primary Examiner* — James D. Rutten
(74) *Attorney, Agent, or Firm* — Amster, Rothstein & Ebenstein LLP

(57) ABSTRACT

A computer system and method for improving the accuracy of predictions of the amount of renewable energy, such as solar energy and wind energy, available to an electric utility, and/or refine such predictions, by providing improved integration of meteorological forecasts. Coefficient values are calculated for a renewable energy generation model by performing a regression analysis with the forecasted level of renewable energy posted by the utility, forecasted weather conditions and measures of seasonality as explanatory variables. Accuracy is further enhanced through the inclusion of a large number of time series variables that reflect the systematic nature of the energy/weather system. The model also uses the original forecast posted by the system operator as well as variables to control for season.

18 Claims, 11 Drawing Sheets

(51) Int. Cl.
*G06F 16/23* (2019.01)
*G06F 17/18* (2006.01)
*G06Q 10/04* (2012.01)
*G06Q 50/06* (2012.01)
*G06F 17/10* (2006.01)
*G01W 1/00* (2006.01)

(52) U.S. Cl.
CPC ............. *G06N 20/00* (2019.01); *G06Q 10/04* (2013.01); *G06Q 50/06* (2013.01); *F05B 2260/8211* (2013.01); *G01W 2001/006* (2013.01); *G01W 2201/00* (2013.01); *G01W 2203/00* (2013.01)

(58) Field of Classification Search
USPC ........................................................ 706/21
See application file for complete search history.

(56) References Cited

U.S. PATENT DOCUMENTS

| | | | | |
|---|---|---|---|---|
| 2003/0200134 | A1* | 10/2003 | Leonard | G06Q 30/02 705/7.31 |
| 2008/0195255 | A1 | 8/2008 | Lutze et al. | |
| 2010/0257133 | A1* | 10/2010 | Crowe | G06Q 10/10 706/58 |
| 2011/0307109 | A1* | 12/2011 | Sri-Jayantha | G06Q 50/06 700/291 |
| 2013/0096983 | A1 | 4/2013 | Forbes et al. | |
| 2014/0278107 | A1* | 9/2014 | Kerrigan | G01W 1/10 702/3 |
| 2015/0015404 | A1* | 1/2015 | Dom | H01R 13/7175 340/657 |
| 2015/0186904 | A1* | 7/2015 | Guha | G06Q 10/06316 705/7.26 |
| 2016/0033986 | A1 | 2/2016 | Kamel et al. | |
| 2017/0124666 | A1* | 5/2017 | Hazra | G06Q 50/06 |
| 2017/0131435 | A1* | 5/2017 | Peacock | G01W 1/10 |
| 2018/0060738 | A1* | 3/2018 | Achin | G06Q 30/0201 |

OTHER PUBLICATIONS

Foley, A. M. et al. (2012) Current Methods and Advances in Forecasting of Wind Power Generation. Renewable Energy 37 (1-8) doi: 10.1016/j.renene.2011.05.033 (Year: 2012).*

K. F. Forbes and E. M. Zampelli, "The accuracy of wind energy forecasts and prospects for improvement," 2017 14th International Conference on the European Energy Market (EEM), Dresden, Jul. 17, 2017, pp. 1-6. (Year: 2017).*

T. Ouyang, Y. He, H. Li, Z. Sun and S. Baek, "Modeling and Forecasting Short-Term Power Load With Copula Model and Deep Belief Network," in IEEE Transactions on Emerging Topics in Computational Intelligence, vol. 3, No. 2, pp. 127-136, Apr. 2019. (Year: 2019).*

Communication Supplemental European Search Report dated Dec. 11, 2019 in connection with European Patent Application No. 17800253.1.

Jung et al. "Current status and future advances for wind speed and power forecasting." In: 1-18 Renewable and Sustainable Energy Reviews. Mar. 2014 (Mar. 2014) Retrieved from <http://www.edd-us.com/wp-contenUuploads/2014/1 O/Paper-E OO-Current-Status-and-Future-Advances-for-Wind-Power-and-Power-Forecasting-March-2014 .pdf> entire document.

Foley et al. "Current methods and advances in forecasting of wind power generation." In: 1-18 Renewable Energy. Jan. 2012 (Jan. 2012) Retrieved from <https://cora.ucc.ie/bitstream/handle/10468/1735/Foley.wind.forecasting.review.ver.4.CORA.pdf?sequence=1&isAllowed=y> entire document.

* cited by examiner

SYSTEM AND METHODS FOR IMPROVING THE ACCURACY OF SOLAR ENERGY AND WIND ENERGY FORECASTS FOR AN ELECTRIC UTILITY GRID

RELATED APPLICATIONS

This application claims priority to and the benefit of U.S. Provisional Application No. 62/338,881, filed May 19, 2016 and entitled SYSTEMS AND METHODS FOR IMPROVING THE ACCURACY OF SOLAR ENERGY AND WIND ENERGY FORECASTS FOR AN ELECTRIC UTILITY GRID, and is related to U.S. patent application Ser. No. 13/438,936, filed Apr. 4, 2012, U.S. Provisional Patent Application No. 61/471,502, filed Apr. 4, 2011, and U.S. Provisional Patent Application No. 61/557,700, filed Nov. 9, 2011. The contents of the above-identified applications are incorporated herein by reference in their entirety.

FIELD

The present invention generally relates to computer systems and methods for predicting the amount of renewable energy, such as solar energy and wind energy, available to an electric utility grid, and/or systems and methods for refining such predictions.

BACKGROUND

In conventional computer systems used to predict the amount of renewable energy to be provided by an electric utility for a given day, technical issues exist in regards to obtaining an accurate prediction for the amount of solar energy and/or wind energy available to the utility for that day. These technical problems relate to how the systems used in such predictions identify, obtain, and interact with other computer systems within the electric grid environment, such as the system operator computer system and various utility computer systems, to obtain relevant data points, and to the processes used to make such predictions accurate.

Current computer systems for providing forecasts of energy generated by renewable energy sources, such as wind power and solar power, whether they be day-ahead, hour-ahead, or even five minutes ahead, are deficient in that they provide forecasts that are inferior to a persistence forecast that naively assumes that the wind energy output in period t will be equal to the level of wind energy in prior period t−1. In fact, it is conventionally believed, based on capacity weighted forecast accuracy metrics, for example, that improvements in wind energy and solar energy forecasting have effectively eliminated the challenge posed by the intermittency of wind and solar energy. This deficiency is also generally present in computer systems for solar energy forecasts. As a result, the forecast inaccuracies associated with the current forecasting computer systems pose a challenge to achieving efficient balancing of supply and demand for electric power on a continuous basis.

SUMMARY

The present invention overcomes these and other technical issues present in the conventional art. In embodiments of the systems and methods of the present invention, the accuracy of renewable energy forecasts is improved by providing forecasting systems which provide improved integration of meteorological forecasts into their renewable energy forecasts.

The present invention relates to improved systems and methods for predicting the amount of renewable energy, such as solar energy and wind energy, available to an electric utility, and/or systems and methods for refining such predictions. The present invention can be used to more efficiently utilize the generators that produce electricity. Utilizing the systems and methods disclosed herein, the present invention can, among other things, enhance environmental quality, contribute to energy efficiency/conservation, and/or contribute to reducing greenhouse gas emissions.

By way of example, the intermittent nature of solar energy and wind energy poses operational challenges to the integration of those renewable energy sources into the electric power system. Specifically, this "intermittency" problem inherent to solar energy and wind energy makes it very difficult for a system operator to balance the supply of electricity with the demand for it. If inaccuracies in solar and wind energy forecasts lead to a level of generation that is greater than actual electricity demand, the system operator may be induced to reduce the output of previously scheduled generating units so as to match electricity supply with demand. This reduction in output can be expected to reduce the operating efficiency of the generating units in question, thereby increasing their emissions of pollution per megawatt-hour of generated electricity. On the other hand, if inaccuracies in solar and wind energy forecasts lead to a level of generation that is less than actual electricity demand, the system operator may be induced to dispatch "peaking" units (e.g., a single cycle turbine) which can have a high degree of operational flexibility but are also high in terms of carbon intensity and other pollutants.

These operational challenges are reflected in the rates that policymakers approve for electric utilities. In the case of balancing charges that are imposed on operators of wind energy plants, for example, it is far from clear that these balancing charges are optimal. It is fairly clear, however, that such balancing charges would be lower if renewable energy forecasts (e.g., solar and wind) were more accurate.

Hence, the systems and methods disclosed for more accurately predicting the amount of electricity available from renewable energy sources, such as solar energy and wind energy, and/or systems and methods for refining such predictions, can enhance environmental quality, contribute to energy efficiency/conservation, and/or contribute to reducing greenhouse gas emissions.

In exemplary embodiments, the present invention refines an initial prediction taking into consideration meteorological factors to form a refined prediction which adjusts for systematic errors associated with the methodology used to generate the initial prediction and/or other information not otherwise taken into consideration in the initial prediction. In such embodiments, the refined prediction can take into account factors such as preliminary predictions, forecasted temperature, forecasted sky conditions, the time of day, and/or anticipated daylight for the period of time.

In an exemplary embodiment of the present invention, a method of improving the accuracy of an energy forecast computer system includes the steps of: obtaining, at the one or more computers, electrical grid information comprising a day-ahead forecasted level of renewable energy generation; accessing, on one or more databases operatively connected to the one or more computers, forecasted weather condition data; and calculating, by the one or more computers, coefficients for a renewable energy generation equation by performing a regression analysis using the forecasted weather condition data. The renewable energy generation equation is a function of a forecasted level of renewable energy generation and the forecasted weather condition data.

In exemplary embodiments of the method, the renewable energy generation equation is a multivariable fractional polynomial (MPF) model.

In another exemplary embodiment of the present invention, the method of predicting an amount of renewable energy available on an electric grid further includes the steps of: accessing, on one or more databases operatively connected to the one or more computers, electrical grid historical data; calculating, by the one or more computers, an equation to predict renewable energy generation based on the forecasted level of renewable energy predicted by the system operator, forecasted weather conditions, variables representing the seasons, and an auto-regressive moving average analysis.

In exemplary embodiments, the auto-regressive moving average analysis is an autoregressive-moving-average with exogenous inputs (ARMAX) model.

In exemplary embodiments, the renewable energy generation equation may include the following variables: a day-ahead forecasted temperature variable; a day-ahead forecasted wind speed variable; a day-ahead forecasted humidity variable; a day-ahead forecasted dew point variable; a day-ahead forecasted visibility variable; a forecasted probability of precipitation variable; a series of binary variables representing forecasted sky conditions; a series of binary variables representing the hour of the day; and/or a series of binary variables representing the season. The binary variable representing the season may represent five consecutive days.

In exemplary embodiments of the present invention, the renewable energy generation equation is a solar energy generation equation. In such embodiments, the solar energy generation equation may include a variable for the day-ahead forecasted level of solar energy generation. The solar energy generation equation may also include a binary variable that is equal to one if there is daylight. The solar energy generation equation may further include the product of the day-ahead forecasted level of solar energy generation and the binary variable that is equal to one if there is daylight.

In other exemplary embodiments, the renewable energy generation equation is a wind energy generation equation. In such embodiments, the wind energy generation equation may include a variable for the day-ahead forecasted level of wind energy generation.

In exemplary embodiments, the predictions of the amount of renewable energy available on an electric grid can be for each hour of the next day. In exemplary embodiments, the prediction can be for each hour of the day, each half hour of each day, fifteen minute segment, ten minute segment, other sub periods of time as may be appropriate.

A method according to an exemplary embodiment of the present invention comprises: (A) accessing, by one or more computers, one or more electronic databases, stored on one or more computer readable media, the one or more databases comprising: (i) forecasted meteorological conditions data associated with forecasted meteorological conditions of a geographical area encompassing an electric power grid; (ii) forecasted renewable energy generation data associated with one or more sources of renewable energy within the electric power grid as obtained from an energy management computer system associated with the electric power grid; (iii) time data comprising at least one of time of day data or season data associated with the electric power grid; (iv) historical data comprising historical renewable energy generation data, historical forecasted meteorological conditions data, historical forecasted renewable energy generation data and historical time data corresponding to the historical forecasted meteorological conditions data and historical forecasted renewable energy generation data; (B) calculating, by the one or more computers, a renewable energy generation forecast based on the forecasted meteorological conditions data, the forecasted renewable energy generation data, the time data and time-series variables determined based on the historical data, wherein the calculating step comprises: (i) calculating, by the one or more computers, a transformed forecast of renewable energy generation by inputting the forecasted meteorological conditions data, the forecasted renewable energy generation data and the time data to a transformed renewable energy forecast equation, the transformed renewable energy forecast equation having been derived at a forecast equation module as follows: 1) determining, by the forecast equation module, an estimated Box-Cox parameter associated with the historical renewable energy generation data by performing an initial Box-Cox analysis on a structural equation comprising the historical renewable energy generation data as a dependent variable and the historical forecasted meteorological conditions data, the historical forecasted renewable energy generation data and the historical time data as independent variables; 2) performing, by the forecast equation module, a Box-Cox transformation of the historical renewable energy generation data using the estimated Box-Cox parameter; 3) performing, by the forecast equation module, a multivariable fractional polynomial analysis on the structural equation using the transformed historical energy generation data as a dependent variable to determine exponents for the independent variables; 4) performing, by the forecast equation module, a subsequent Box-Cox analysis of the structural equation using the historical renewable energy generation data as a dependent variable and the historical forecasted meteorological conditions data, the historical forecasted renewable energy generation data and the historical time data as independent variables with the exponents as determined by the multivariable fractional polynomial analysis so as to determine a revised estimated Box-Cox parameter; 5) determining, by the forecast equation module, whether the estimated Box-Cox parameter is equal to the revised estimated Box-Cox parameter; 6) upon the condition that the estimated Box-Cox parameter is not equal to the revised estimated Box-Cox parameter, replacing, by the forecast equation module, the estimated Box-Cox parameter with the revised estimated Box-Cox parameter and iterating back to step 4); 7) upon the condition that the estimated Box-Cox parameter is equal to the revised estimated Box-Cox parameter, generating, by the forecast equation module, a transformed structural equation for the renewable energy forecast, where the transformed structural equation is based on the revised estimated Box-Cox parameter and the corresponding independent variables as transformed by the multivariable fraction polynomial analysis; 8) determining, by the forecast equation module, a plurality of time series variables associated with the transformed structural equation by performing a time series analysis of the transformed structural equation; and 9) generating, by the forecast equation module, the transformed renewable energy forecast equation as a combination of the transformed structural equation and the one or more time series variables; (ii) calculating, by the one or more computers, a transformed renewable energy generation forecast using the transformed structural equation; and (iii) calculating, by the one or more computers, an untransformed renewable energy generation forecast by applying the revised estimated Box-Cox parameter to the calculated transformed renewable energy generation forecast; and C) providing, by the one or more computers, to an energy management computer system, the untransformed renewable energy generation forecast for generation of a schedule of conventional and renewable energy generation within the electric power grid.

A system according to an exemplary embodiment of the present invention comprises: one or more data processing apparatus; and a computer-readable medium coupled to the one or more data processing apparatus having instructions stored thereon which, when executed by the one or more data processing apparatus, cause the one or more data processing apparatus to perform a method comprising: (A) accessing, by one or more computers, one or more electronic databases, stored on one or more computer readable media, the one or more databases comprising: (i) forecasted meteorological conditions data associated with forecasted meteorological conditions of a geographical area encompassing an electric power grid; (ii) forecasted renewable energy generation data associated with one or more sources of renewable energy within the electric power grid as obtained from an energy management computer system associated with the electric power grid; (iii) time data comprising at least one of time of day data or season data associated with the electric power grid; (iv) historical data comprising historical renewable energy generation data, historical forecasted meteorological conditions data, historical forecasted renewable energy generation data and historical time data corresponding to the historical forecasted meteorological conditions data and historical forecasted renewable energy generation data; (B) calculating, by the one or more computers, a renewable energy generation forecast based on the forecasted meteorological conditions data, the forecasted renewable energy generation data, the time data and time-series variables determined based on the historical data, wherein the calculating step comprises: (i) calculating, by the one or more computers, a transformed forecast of renewable energy generation by inputting the forecasted meteorological conditions data, the forecasted renewable energy generation data and the time data to a transformed renewable energy forecast equation, the transformed renewable energy forecast equation having been derived at a forecast equation module as follows: 1) determining, by the forecast equation module, an estimated Box-Cox parameter associated with the historical renewable energy generation data by performing an initial Box-Cox analysis on a structural equation comprising the historical renewable energy generation data as a dependent variable and the historical forecasted meteorological conditions data, the historical forecasted renewable energy generation data and the historical time data as independent variables; 2) performing, by the forecast equation module, a Box-Cox transformation of the historical renewable energy generation data using the estimated Box-Cox parameter; 3) performing, by the forecast equation module, a multivariable fractional polynomial analysis on the structural equation using the transformed historical energy generation data as a dependent variable to determine exponents for the independent variables; 4) performing, by the forecast equation module, a subsequent Box-Cox analysis of the structural equation using the historical renewable energy generation data as a dependent variable and the historical forecasted meteorological conditions data, the historical forecasted renewable energy generation data and the historical time data as independent variables with the exponents as determined by the multivariable fractional polynomial analysis so as to determine a revised estimated Box-Cox parameter; 5) determining, by the forecast equation module, whether the estimated Box-Cox parameter is equal to the revised estimated Box-Cox parameter; 6) upon the condition that the estimated Box-Cox parameter is not equal to the revised estimated Box-Cox parameter, replacing, by the forecast equation module, the estimated Box-Cox parameter with the revised estimated Box-Cox parameter and iterating back to step 4); 7) upon the condition that the estimated Box-Cox parameter is equal to the revised estimated Box-Cox parameter, generating, by the forecast equation module, a transformed structural equation for the renewable energy forecast, where the transformed structural equation is based on the revised estimated Box-Cox parameter and the corresponding independent variables as transformed by the multivariable fraction polynomial analysis; 8) determining, by the forecast equation module, a plurality of time series variables associated with the transformed structural equation by performing a time series analysis of the transformed structural equation; and 9) generating, by the forecast equation module, the transformed renewable energy forecast equation as a combination of the transformed structural equation and the one or more time series variables; (ii) calculating, by the one or more computers, a transformed renewable energy generation forecast using the transformed structural equation; and (iii) calculating, by the one or more computers, an untransformed renewable energy generation forecast by applying the revised estimated Box-Cox parameter to the calculated transformed renewable energy generation forecast; and C) providing, by the one or more computers, to an energy management computer system, the untransformed renewable energy generation forecast for generation of a schedule of conventional and renewable energy generation within the electric power grid.

According to an exemplary embodiment, the forecasted meteorological conditions comprises one or more of the following: day-ahead forecasted temperature; day-ahead forecasted wind speed; day-ahead forecasted humidity; day-ahead forecasted dewpoint; day-ahead forecasted visibility; forecasted probability of precipitation; and forecasted sky conditions.

According to an exemplary embodiment, the forecasted renewable energy generation data comprises one or more of the following: day-ahead or period-ahead forecasted level of renewable energy generation and day-ahead forecasted level of renewable energy by season.

According to an exemplary embodiment, the time data comprises at least one of seconds, minutes, hours or season.

According to an exemplary embodiment, the renewable energy is at least one of solar energy or wind energy.

According to an exemplary embodiment, the one or more time series variables comprises 20 or more time series variables.

According to an exemplary embodiment, the one or more time series variables comprises 50 or more time series variables.

According to an exemplary embodiment, the transformed renewable energy forecast equation is:

$$y_t = x_t\beta + \Sigma_{j=1}^{P}\rho_j\{y_{t-j} - x_{t-j}\beta\} + \Sigma_{k=1}^{q}\vartheta_k\epsilon_{t-k} + \epsilon_t$$

where y is the Box-Cox transformed measure of the renewable energy production, x is a MFP transformed vector of explanatory variables, $\beta$ is a vector of the structural parameters, $\rho j$ are autoregressive parameters, $\vartheta k$ are moving average parameters, and $\epsilon\_(t-k)$ is a residual error term for period t-k.

BRIEF DESCRIPTION OF THE DRAWINGS

The features and advantages of the present invention will be more fully understood with reference to the following, detailed description when taken in conjunction with the accompanying figures, wherein.

DETAILED DESCRIPTION

The present invention addresses the disadvantages of conventional computer systems for predicting energy generation, particularly renewable energy generation, and the integration of those predictions with energy management computer systems of an electric power grid, in that such conventional systems are not able to accurately forecast levels of renewable energy generation (e.g., intermittencies in renewably energy generation are not adequately captured in conventional forecasts), leading to inefficiencies within the electric power grid that ultimately have negative economic and environmental effects. The present invention addresses these concerns by providing improved systems and methods for predicting the amount of renewable energy, such as solar energy and wind energy, available to an electric utility, and/or systems and methods for refining such predictions. The present invention can be used to more efficiently utilize the generators that produce electricity. Utilizing the systems and methods disclosed herein, the present invention can, among other things, enhance environmental quality, contribute to energy efficiency/conservation, and/or contribute to reducing greenhouse gas emissions.

The present invention relates to systems and methods for predicting the amount of electricity available to an electric utility from renewable energy sources, such as solar energy and wind energy, and/or systems and methods for refining such predictions. More specifically, the present invention relates to systems and methods for controlling an electric utility grid based on interactions between computer systems, including an electric grid computer system that incorporates a renewable energy generation prediction component and an electric grid control computer system, to achieve a more efficient operation of the various utilities within the grid. Further, by achieving more efficient operation, the processing load on such computer systems is reduced, leading to a more refined, efficient and rapid control of the electric utility grid.

Figure 1:
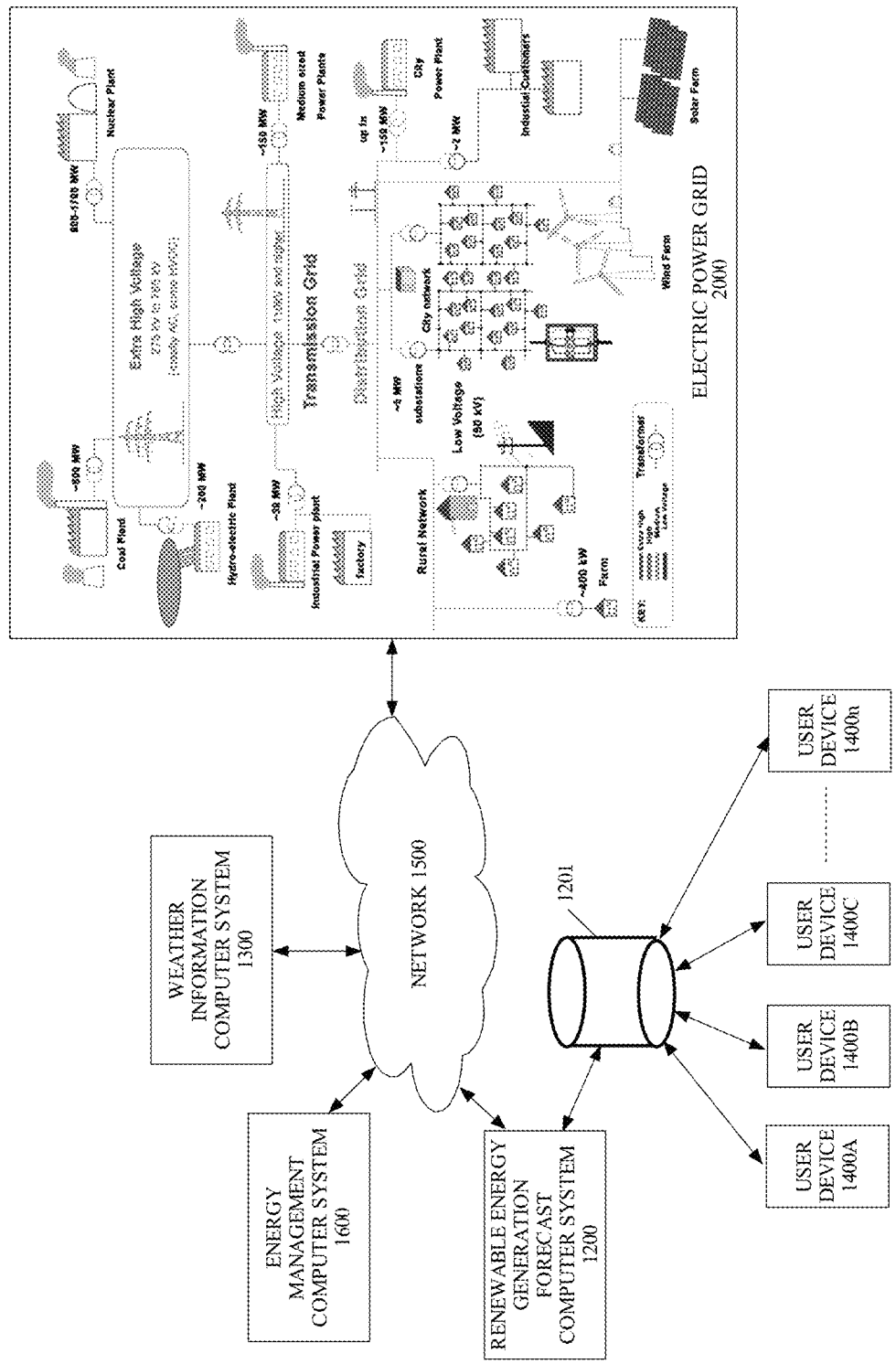
FIG. 1 is a block diagram of certain components of a system for improving the accuracy of an energy generation forecast for an electric utility grid according to an exemplary embodiment of the present invention.

FIG. 1 is a block diagram showing the interaction between a renewable energy forecast computer system 1200, an energy management computer system 1600 and an electric power grid 2000 according to an exemplary embodiment of the present invention. As explained in more detail herein, the renewable energy forecast computer system 1200 is configured to provide refined renewable energy generation forecasts based on a counterintuitive use of meteorological data, time data (e.g., time of day and season) and time-series data as input to a forecast algorithm that also uses input of renewable energy generation forecasts determined by and/or retrieved from the energy management computer system 1600 that already takes weather forecasts into account. The forecast algorithm uses raw historical data points related to actual renewable energy generation and related independent variables to determine a structural model augmented by time-series variables that account for the inertia in the weather/energy system.

The renewable energy forecast computer system 1200 obtains electrical grid information from a database 1201. Such electrical grid information can include, for example, a day-ahead forecasted level of renewable energy generation, e.g., by solar power or by wind power. The electrical grid information can also include any of the variables disclosed herein in connection with embodiments of the present invention.

In exemplary embodiments of the system of the present invention, renewable energy forecast system 1200 also obtains weather information provided by weather information system 1300. As shown in FIG. 1, the energy generation prediction system 1200 can obtain the necessary weather information from weather information system 1300 through network 1500, either directly or, alternatively, after such information is stored in database 1201.

As also shown in FIG. 1, the renewable energy generation system 1200 can communicate with one or more user devices 1400a-1400n as necessary or desirable in accordance with embodiments of the present invention.

All computers, computer systems, and/or user devices described herein may comprise one or more processors and non-transitory computer-readable memory (e.g., local and/or remote memory) having stored thereon computer-readable instructions to perform the processes described herein with respect to each device and/or computer system. In embodiments, various processing may be performed by particularly programmed software agents or software modules. Each device and/or computer system may store data in its respective memory, which may be organized in one or more databases. Each device and/or computer system may also have one or more input devices (e.g., touchscreen, pointer device, mouse, keyboard, microphone, camera, video camera, to name a few) and/or one or more output devices (e.g., display screens, projectors, speakers). In embodiments, computer systems may comprise one or more servers or server farms, which may not have physical input or output devices directly connected thereto or embedded therein.

Each device and/or computer system may also include one or more communication portals. Accordingly, the devices and/or computer systems (e.g., renewable energy forecast computer system 1200 and weather information system 1300, user devices 1400a-1400n) may be operatively connected directly, e.g., via wired or wireless communications, and/or indirectly, e.g., via a data network 1500, such as the Internet, a telephone network, a mobile broadband network (e.g., a cellular data network), a mesh network, a local area network (LAN) (including a wireless local area network, e.g., a Wi-Fi network), a wide area network (WAN), a metropolitan area network (MAN), and/or a global area network (GAN), to name a few. Data networks may be provided via wired and/or wireless connections. Data networks may be public or private. Accordingly, data networks may be open or closed, such as requiring authorized access, specific communication connections, or specialized hardware and/or software. In embodiments, any combination of communications channels may be utilized.

The respective communications portals of each computer system and/or user device may handle, process, support, and/or perform wired and/or wireless communications, such as transmitting and/or receiving data (e.g., data packets). In embodiments, transmission described with respect to a single data packet may comprise a plurality of data packets. Data packets may be discrete electronic units of data. In other embodiments, transmissions may comprise non-discrete signals, such as data streams. Transmissions described with respect to data packets may also comprise data transmissions via other communications mechanisms known in the art, such as data streams. Communications portals can comprise hardware (e.g., hardware for wired and/or wireless connections, such as communications chipsets, communications interfaces, and/or communications antennas, to name a few) and/or software.

Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, 5G, and/or LTE, to name a few), Bluetooth, Bluetooth Low Energy, Wi-Fi, radio, satellite, infrared connections, ZigBee communication protocols, to name a few. Communications interface hardware and/or software, which may be used to communicate over wired and/or wireless connections, may comprise Ethernet interfaces (e.g., supporting a TCP/IP stack), X.25 interfaces, T1 interfaces, and/or antennas, to name a few.

Figure 2:
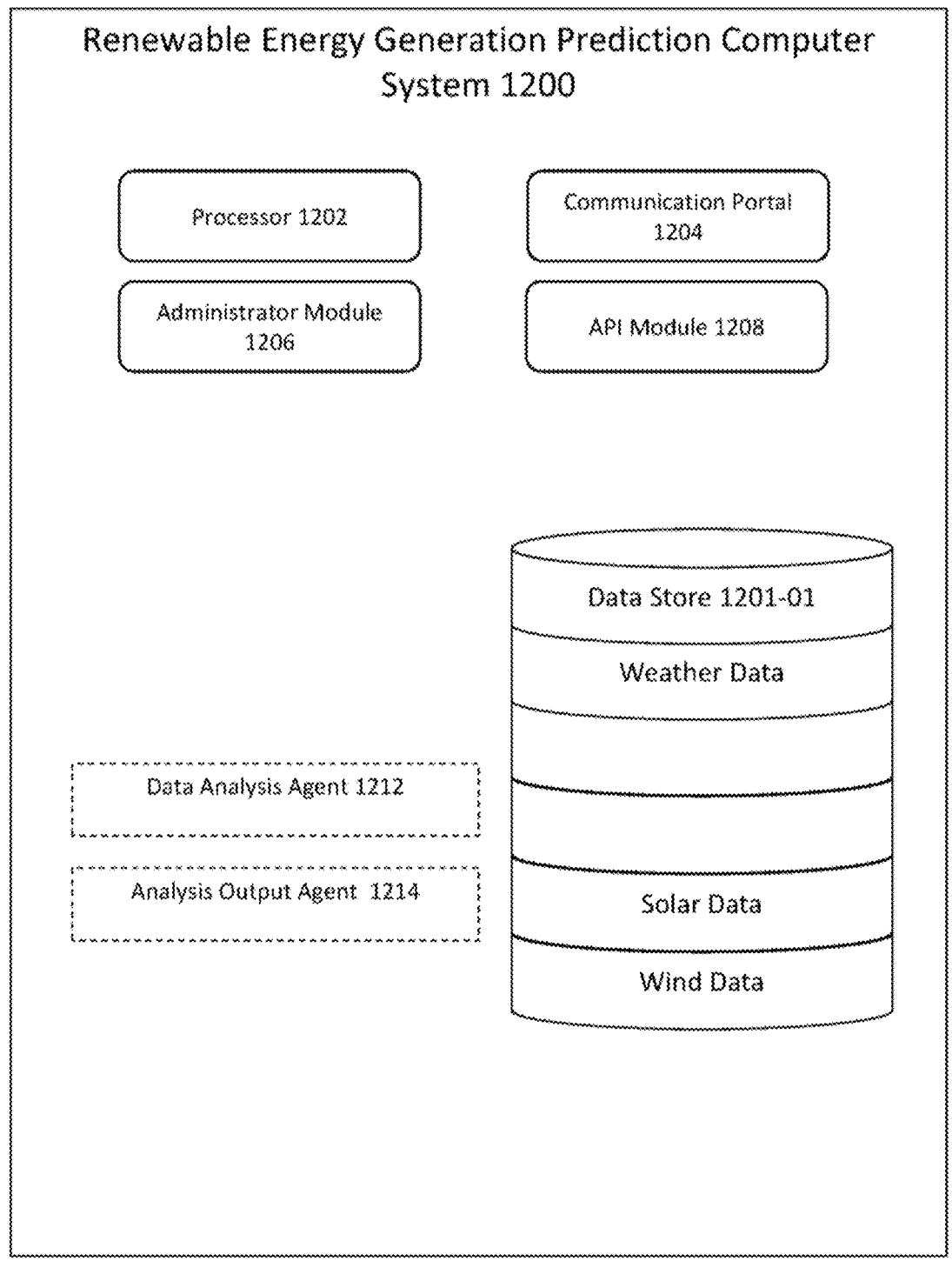
FIG. 2 is a block diagram of certain components of the renewable energy forecast computer system as shown in FIG. 1 according to an exemplary embodiment of the present invention.

Referring to FIG. 2, the renewable energy generation forecast computer system 1200 may include a computer system having a non-transitory computer-readable memory, which may store data, e.g., in one or more databases or data stores 1201-01. Accordingly, the renewable energy generation system 1200 can store various types of weather data and other variables, as described herein in connection with embodiments of the present invention. According to an exemplary embodiment, the system 1200 stores historical and current forecasts of weather with the following variables: forecasted temperature, forecasted humidity, forecasted cloud cover, forecasted dew point, etc., and the data stores contain the historical and current renewable energy forecasts posted by the system operator and/or obtained from the energy management computer system 1600.

The renewable energy generation system 1200 may also include one or more software modules stored in the memory and configured to execute machine-readable instructions to perform one or more processes. Such modules can include modules that perform the calculations described herein with regard to improving the accuracy of the renewable energy generation prediction computer system. The processes and functions described with respect to each module may be performed by one or more other modules, such as other modules described herein or additional modules.

Figure 3:
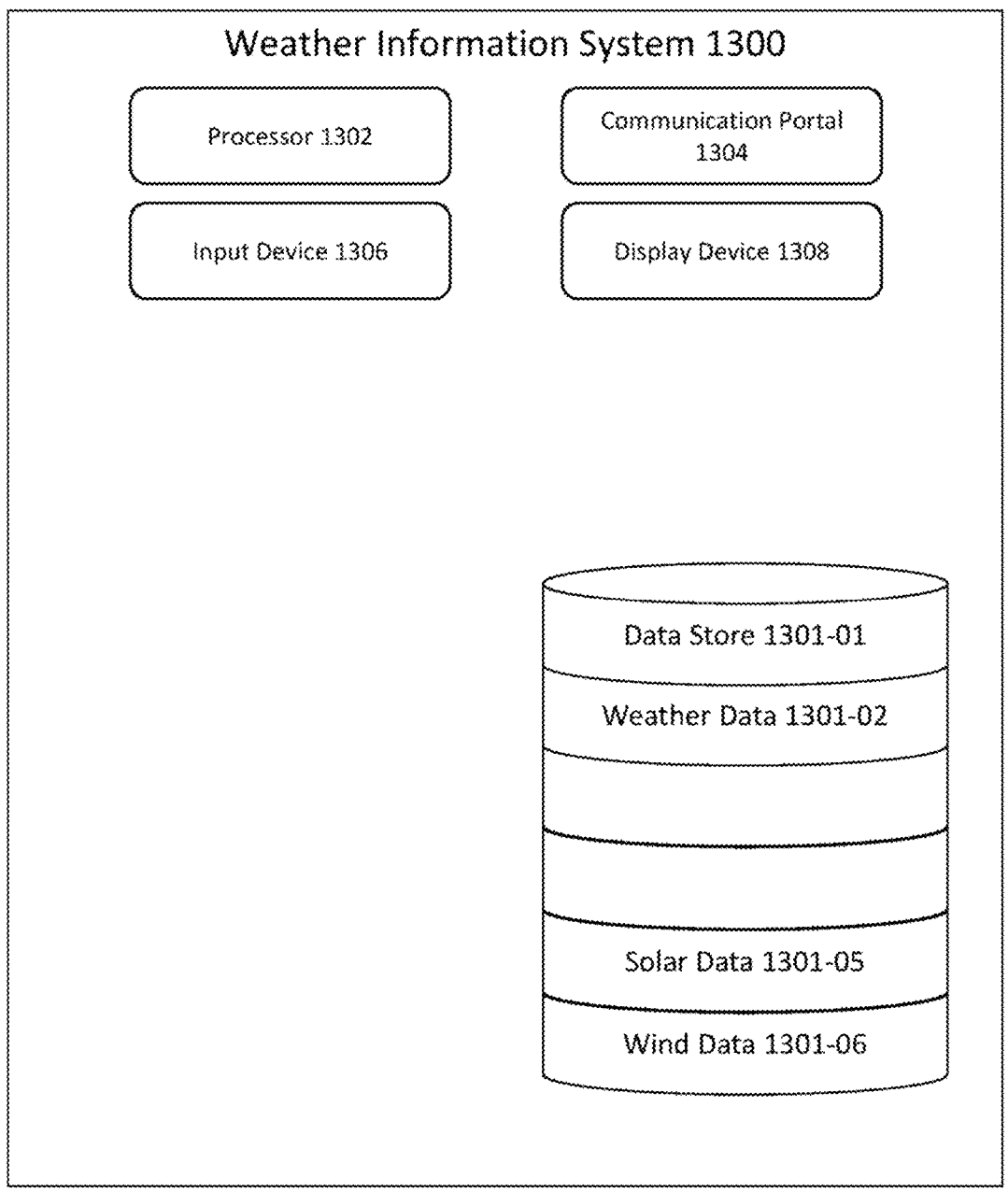
FIG. 3 is a block diagram of certain components of the weather information computer system as shown in FIG. 1 according to an exemplary embodiment of the present invention.

Referring to FIG. 3, the weather information computer system 1300 may comprise a computer system having a non-transitory computer-readable memory, which may store data, e.g., in one or more databases or data stores 1301-01. Accordingly, the weather information system 1300 can store various types of weather data and other variables used in the renewable energy generation prediction system 1200, as described herein in connection with embodiments of the present invention.

The weather information system 1300 may also include one or more software modules stored in the memory and configured to execute machine-readable instructions to perform one or more processes. Such modules can include modules that provide the weather information described herein with regard to improving the accuracy of the renewable energy generation prediction system 1200. The processes and functions described with respect to each module may be performed by one or more other modules, such as other modules described herein or additional modules.

Figure 4:
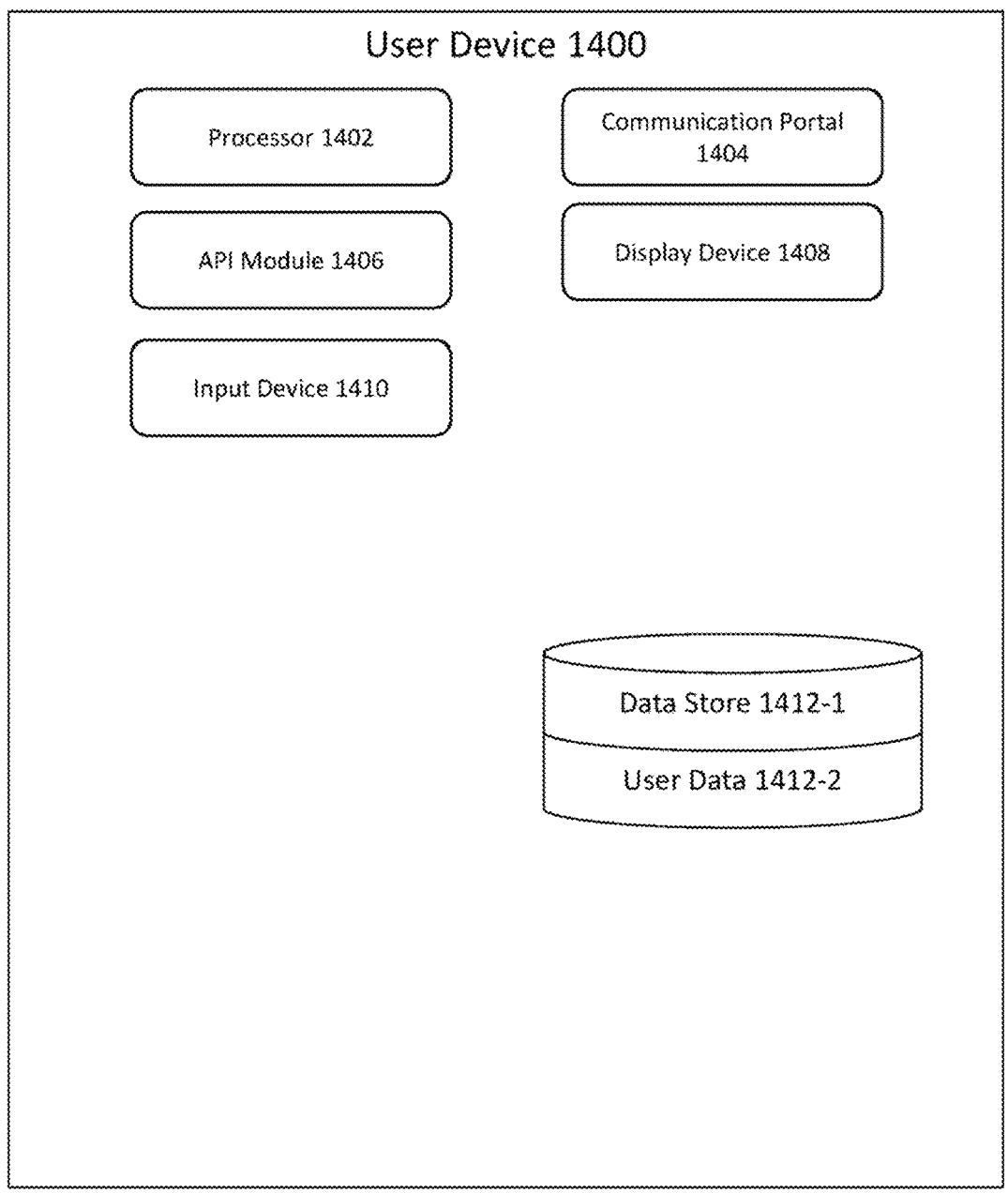
FIG. 4 is a block diagram of certain components of the user devices as shown in FIG. 1 according to an exemplary embodiment of the present invention.

Referring to FIG. 4, a user device 1400 may comprise a computer system having a non-transitory computer-readable memory, which may store data, e.g., in one or more databases or data stores 1412-1, 1412-2, etc. Accordingly, the user device 1400 can store various types of weather data and other variables used in the renewable energy generation prediction system 1200, as described herein in connection with embodiments of the present invention.

The user device 1400 may also include one or more software modules stored in the memory and configured to execute machine-readable instructions to perform one or more processes. Such modules can include modules that provide the weather information and other variables described herein with regard to improving the accuracy of the renewable energy generation prediction computer system 1200. The processes and functions described with respect to each module may be performed by one or more other modules, such as other modules described herein or additional modules.

Figure 5:
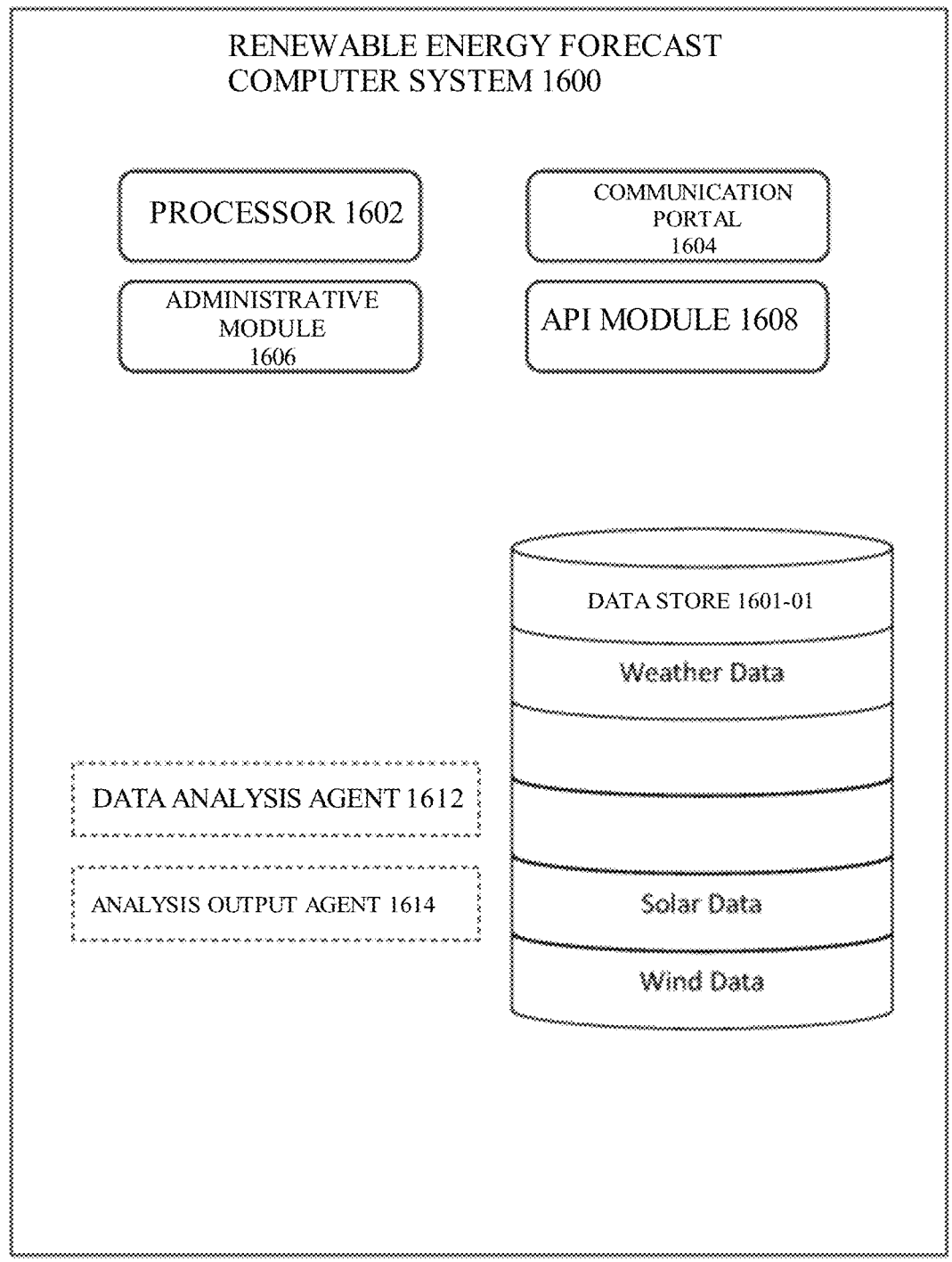
FIG. 5 is a block diagram of certain components of the renewable energy forecast computer system as shown in FIG. 1 according to an exemplary embodiment of the present invention.

Referring to FIG. 5, the energy management computer system 1600 may include a computer system having a non-transitory computer-readable memory, which may store data, e.g., in one or more databases or data stores 1601-01. Accordingly, the energy management computer system 1600 can store various types of energy management and control data and other variables, as described herein in connection with embodiments of the present invention.

The energy management computer system 1600 may also include one or more software modules stored in the memory and configured to execute machine-readable instructions to perform one or more processes. Such modules may be part of a system of computer-aided tools used by operators of electric utility grids to monitor, control, and optimize the performance of the generation and/or transmission systems of various renewable and conventional energy generation utilities within the electric power grid 2000. More specifically, the energy management system 1600 may access and/or incorporate various computer software and hardware tools to carry out one or more of the following functions related to the electric power grid 2000: monitoring and control, generation control, load forecasting, load balancing and optimization of economic factors in generation and transmission of electricity, optimization of security and reliability. In exemplary embodiments, the energy management control system 1600 may include a SCADA (supervisory control and data acquisition) system to collect data from instruments and sensors located at remote sites and to transmit data at a central site for either monitoring or controlling purpose. More specifically, the SCADA system may include a control system architecture that uses computers, networked data communications and graphical user interfaces for high-level process supervisory management, and uses other peripheral devices such as programmable logic controllers and discrete PID controllers to interface to the various points within the electric power grid 1600. The operator interfaces which enable monitoring and the issuing of process commands, such as controller set point changes, may be handled through the SCADA supervisory computer system. Real-time control logic or controller calculations may be performed by networked modules which connect to the field sensors and actuators. The processes and functions described with respect to each module within the energy management computer system 1600 may be performed by one or more other modules, such as other modules described herein or additional modules.

A comparison of wind, and solar energy forecasts using the Mean-Squared-Error Skill Score (MSESS) metric, which evaluates the skill of a forecast relative to a persistence forecast, i.e., a period-ahead forecast that naively assumes the outcome in period t equals the outcome in period t−1 reveals that the majority of solar and wind energy forecasts, as determined using conventional techniques, are less accurate than both load forecasts and their corresponding persistence forecasts. In accordance with embodiments of the present invention, an ordinary least squares (OLS) regression of solar forecast errors on the day-ahead forecasted weather conditions yields highly statistically significant coefficients on a nontrivial number of variables representing forecasted weather conditions. This result indicates that forecasted weather conditions are not optimally incorporated into the renewable energy forecasts.

The MSESS metric is calculated as follows:

$$MSESS = 1 - \frac{MSE_F}{MSE_P},$$

where $MSE_F$ is the mean squared error of the forecast under evaluation and $MSE_P$ is the mean squared error of the persistence forecast. A MSESS equal to 1 indicates a perfect forecast, while a MSESS equal to 0 indicates that the forecast skill is equal to that of the persistence forecast. A negative (positive) MSESS indicate that the forecast under evaluation is inferior (superior) to a persistence forecast.

The MSESS metric can be calculated using the MSE of a forecast that presumes the forecasted level in period t equals the average. However, in preferred embodiments in accordance with the present invention, the MSESS metric can be calculated using the MSE of a persistence forecast, because it respects the fact that the outcome in period t is positively correlated with the outcome in period t−1.

MSESSs were computed for the following zones/control areas: Bonneville Power Administration (BPA); California Independent System Operator (CAISO), SP15 and NP15; Midcontinent Independent System Operator (MISO); PJM Interconnection; 50 Hertz (Germany); Amprion (Germany); Elia (Belgium); RTE (France); Finland; Sweden; Norway; Eastern Denmark; and Western Denmark.

The MSESSs were calculated for wind energy, solar energy, and the load on the electric utility grid. However, in some cases (e.g., Norway), it was only possible to calculate a MSESS for load. In other cases, it was only possible to calculate a MSESS for either wind energy or solar energy, but not both.

The results of the MSESS calculations are shown in Table 1. Inspection of Table 1 reveals that the MSESSs of load forecasts are generally positive, thus indicating that the load forecasts have greater accuracy than their persistence forecasts. In stark contrast, the MSESSs of all wind energy forecasts, along with all but the two solar energy forecasts for CAISO, are negative. These results reflect the inferiority of the wind energy and solar energy forecasts relative to even the naïve persistence forecasts.

For 50 Hertz and Amprion, the load forecasts are reported as inferior to the persistence forecasts. One possible reason for this result is that the load forecasts in the 50 Hertz and Amprion control areas are based on forecasted generation and forecasted interchange, and thus may reflect the challenge of accurately forecasting wind and solar energy. The MSESS corresponding to Belgium's load is also negative. Elia, the system operator in Belgium, has recently revised its forecast methodology.

TABLE 1

Mean Squared Error Skill Scores with Persistence Forecasts as a Reference

| Control Area/Zone | Forecast Type | Sample Period | Observations | Granularity | MSESS |
|---|---|---|---|---|---|
| 50 Hertz | Day-Ahead Load | 1Jan2011-31Dec2013 | 104,590 | Quarter-Hour | −62.7486 |
|  | Day-Ahead Wind | 1Jan2011-31Dec2013 | 104,590 | Quarter-Hour | −31.3501 |
|  | Day-Ahead Solar | 1Jan2011-31Dec2013 | 54,545 | Quarter-Hour | −5.2683[1] |
| Amprion | Day-Ahead Load | 1Jan2011-31Dec2013 | 103,326 | Quarter-Hour | −12.3308 |
|  | Day-Ahead Wind | 1Jan2011-31Dec2013 | 103,326 | Quarter-Hour | −14.5887 |
|  | Day-Ahead Solar | 1Jan2011-31Dec2013 | 55,498 | Quarter-Hour | −11.2069[1] |
| California ISO | Day-Ahead Load | 1Jan2013-31Dec2013 | 8,760 | Hourly | 0.6026 |
| NP15 | Day-Ahead Wind | 1Jan2013-31Dec2013 | 8,704 | Hourly | −6.1401 |
| NP15 | Hour-Ahead Wind | 1Jan2013-31Dec2013 | 8,704 | Hourly | −2.3605 |
| NP15 | Day-Ahead Solar | 1Jan2013-31Dec2013 | 8,666 | Hourly | −3.2002 |
| NP15 | Hour-Ahead Solar | 1Jan2013-31Dec2013 | 8,666 | Hourly | −2.4846 |
| SP15 | Day-Ahead Wind | 1Jan2013-31Dec2013 | 8,752 | Hourly | −4.8210 |
| SP15 | Hour-Ahead Wind | 1Jan2013-31Dec2013 | 8,752 | Hourly | −2.1894 |
| SP15 | Day-Ahead Solar | 1Jan2013-31Dec2013 | 8,752 | Hourly | 0.7050 |
| SP15 | Hour-Ahead Solar | 1Jan2013-31Dec2013 | 8,752 | Hourly | 0.7972 |
| Belgium | Day-Ahead Load | 1Jan2011-31Dec2013 | 105,204 | Quarter-Hour | −9.859 |
|  | Day-Ahead Solar | 1Jan2013-31Dec2013 | 17,921 | Quarter-Hour | −12.262[1] |
|  | Intra-Day Solar | 1Jan2013-31Dec2013 | 11,278 | Quarter-Hour | −9.793[1] |
| France | Day-Ahead Load | 1Jan2012-31Dec2013 | 35,088 | Half-Hourly | 0.3842 |
|  | Day-Ahead Wind | 1Jan2012-31Dec2013 | 17,349 | Hourly | −5.7375 |
|  | Hour 1 Same Day, Wind | 1Jan2012-31Dec2013 | 15,109 | Hourly | −5.2889 |
| Norway | Day-Ahead Load | 1Jan2011-31Dec2013 | 26,160 | Hourly | 0.1870 |
| Sweden | Day-Ahead Load | 1Jan2011-31Dec2013 | 26,160 | Hourly | 0.2008 |
| Finland | Day-Ahead Load | 1Jan2011-31Dec2013 | 26,159 | Hourly | 0.0486 |
| Eastern Denmark | Day-Ahead Load | 1Jan2011-31Dec2013 | 26,160 | Hourly | 0.3953 |
|  | Day-Ahead Wind | 1Jan2011-31Dec2013 | 26,107 | Hourly | −2.7507 |
| Western Denmark | Day-Ahead Load | 1Jan2011-31Dec2013 | 26,160 | Hourly | 0.6560 |
|  | Day-Ahead Wind | 1Jan2011-31Dec2013 | 26,105 | Hourly | −3.6749 |
| MISO | Day-Ahead Wind Energy | 1Jan2011-31Dec2013 | 26,303 | Hourly | −4.3873 |
| PJM | Day-Ahead Load | 1Jan2011-31Dec2013 | 26,160 | Hourly | 0.4727 |
| New York City | Day-Ahead Load | 1Jan2011-31Dec2013 | 25,675 | Hourly | 0.1703 |
| Bonneville Power | Five Minute-Ahead Wind | 1Jan2012-31Dec2013 | 206,477 | Five minutes | −36.2576[2] |
|  | Hour-Ahead Wind | 1Jan2012-31Dec2013 | 16,847 | Hourly | −0.8135[2] |

[1]Daylight portion of the sample period
[2]MSESS calculation excludes periods in which wind energy production was curtailed by the system operator. BPA reports three different hour-ahead forecasts: Average, Minimum, and Maximum. The reported MSESS of −0.8135 is based on BPA Average forecast. The MSESSs for the Minimum and Maximum hour-ahead forecasts are −2.90 and −2.24, respectively.

Figure 7:
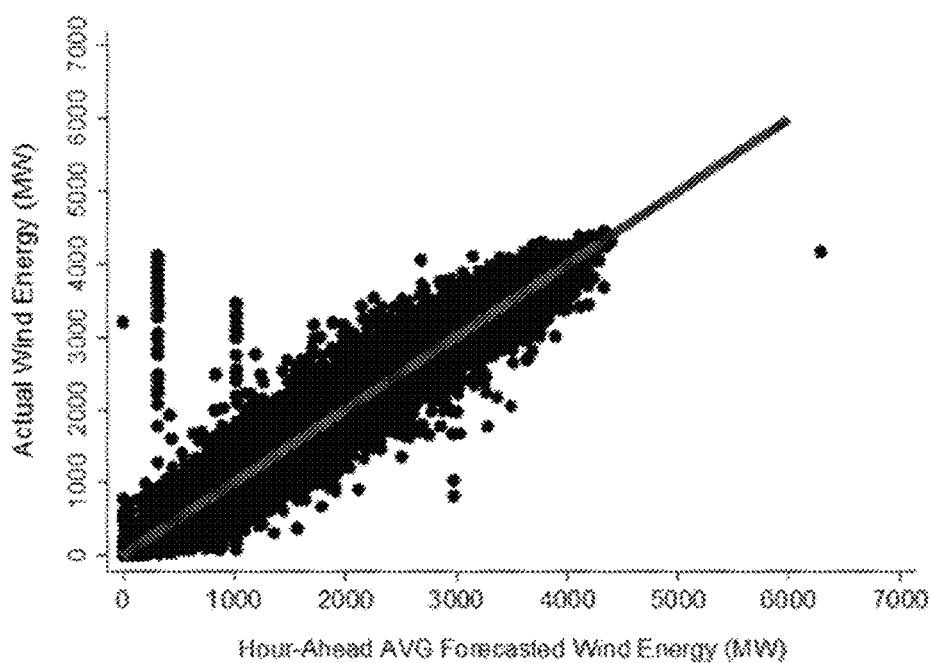
FIG. 7 is a scatter diagram illustrating an exemplary relationship between actual wind energy and the hour-ahead forecast of wind energy, as published by the Bonneville Power Administration (BPA), for the period Jan. 1, 2012-Dec. 31, 2013.

FIG. 7 provides a visual sense of the degree of inaccuracy of the conventional wind energy forecasts. FIG. 7 shows a scatter diagram of the hour-ahead forecasted and actual wind energy in the Bonneville Power Administration (BPA), with the 45° line representing a locus of perfect forecasts (i.e., RMSE=0 and MSESS=1). Though the forecast is very near to real time, there can still be observed significant differences between the forecasted and actual wind energy levels. In terms of the error metrics, the energy weighted RMSE is 23.1 percent and the MSESS is −0.8134.

Figure 8:
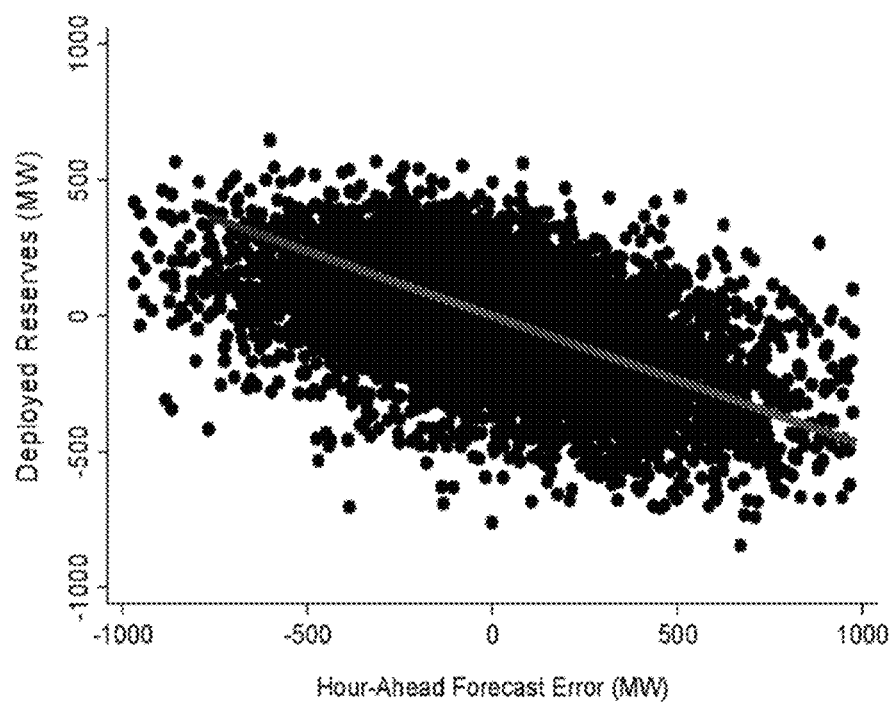
FIG. 8 is a scatter diagram illustrating an exemplary relationship between hour-ahead wind energy forecast errors and the deployment of balancing energy, as published by BPA, for the period Jan. 1, 2012-Dec. 31, 2013. BPA reports three forecasts for each hour: Average, Maximum, and Minimum. The hour-ahead forecast shown in FIG. 2 is the average. This is the most accurate of BPA's three forecasts.

The forecast errors represented by FIG. 8 have consequences for the deployment of balancing power, BPA's transmission flows with other control areas, and the deviations of system frequency away from the reliability goal of 60 Hz. Indeed, as shown in FIG. 8, for forecast errors less than 1,000 Megawatts (MW) in magnitude, the relationship between the forecast error and the deployment of balancing power is visually apparent.

Furthermore, the operational challenges of integrating wind energy into the electric power system have not gone unnoticed by the operators of the BPA and the policymakers that approve its rates. Under BPA's July 2015 rate proceeding (BPA, BP16 Rate Proceeding: Administrator's Final Record of Decision, July 2015. Available at https://www.bpa.gov/news/pubs/RecordsofDecision/rod-20150723-BP-16-Rate-Proceeding.pdf), the contents of which are hereby incorporated by reference in their entirety, the balancing services rate for the operators of wind plants in the BPA control area with uncommitted scheduling equals $1.48 per kilowatt of capacity per month with $1.08 of this charge being the cost of imbalance reserves (the rate ranges from $0.73 to $1.20 per kilowatt of capacity depending on the operator's willingness to commit to various forms of the BPA scheduling process). This works out to be about $8.63 per MWh based on BPA's installed wind energy capacity of about 5,100 MW and its 2015 average wind capacity factor of about 23.5 percent (with a range of $4.23-$7.00 depending on the operator's willingness to commit to BPA's scheduling process). It is far from clear that these balancing charges are optimal in the sense of reflecting the full marginal costs of the intermittency of wind power. What is fairly clear is that the balancing charges BPA imposes on wind energy plants would be lower if the wind energy forecasts were more accurate.

Figure 9:
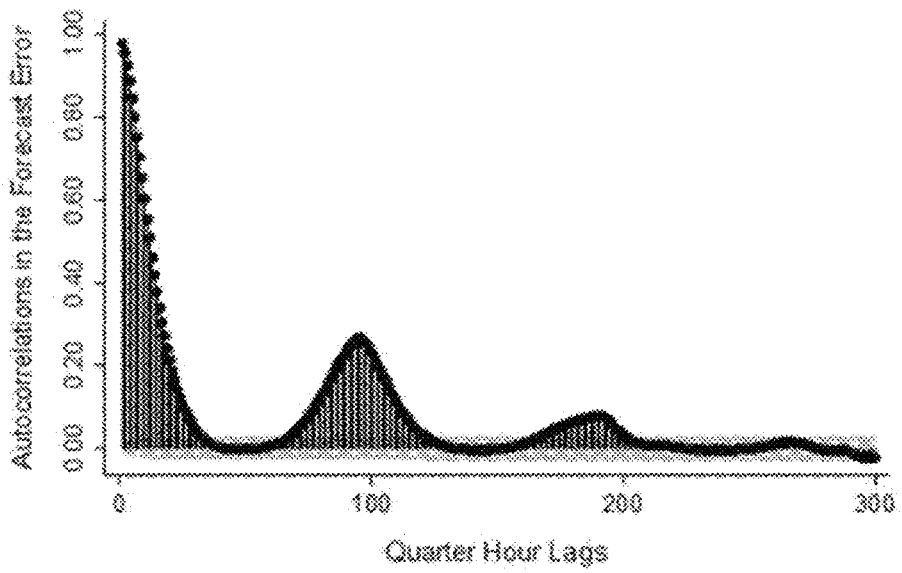
FIG. 9 illustrates an exemplary graph as published by 50 Hertz, including exemplary kinds of data that can be used with exemplary embodiments of the present invention.

In accordance with the embodiments of the present invention, the errors in existing forecasts were examined. If existing forecasts are optimal, in the sense that they reflect all known information, then the forecast errors will be purely random (i.e. "white noise"). Referring to FIG. 9, based on Portmanteau (Q) tests for quarter hour lags 1 through 300, none of the forecast errors that have been evaluated exhibit the white noise property. For example, the null hypothesis of white noise is strongly rejected for 50 Hertz's solar energy forecast errors with p-values of 0.0000. As shown by FIG. 9, the autocorrelation in these forecast errors exhibits a significant diurnal pattern.

In accordance with embodiments of the present invention, it has also been determined that solar energy forecast errors are statistically related with forecasted weather conditions. This assessment makes use of hourly day-ahead weather forecasts for Berlin, Germany, obtained from Custom-Weather, a specialized provider of weather forecasts based in San Francisco (http://customweather.com/). An OLS regression of 50 Hertz's solar forecast errors (as measured by actual solar energy minus forecasted solar energy) on the day-ahead forecasted weather conditions for Berlin yields highly statistically significant coefficients on forecasted temperature, dewpoint, visibility, and the probability of precipitation, as shown in Table 2. A number of the coefficients corresponding to forecasted cloud cover are also highly statistically significant and nontrivial in magnitude. In addition, the OLS regression indicates that the magnitude of the solar energy forecast error is not independent from the forecasted level of solar energy.

An OLS analysis of 50 Hertz's wind forecast errors (which were not reported) indicates that such deficiencies are not limited to solar energy forecasts. Moreover, an analysis of the solar energy and wind energy forecast errors in other control areas indicates that this issue is not confined to 50 Hertz. For example, an OLS analysis of the wind forecast errors in both BPA and Great Britain yields results similar to those reported in Table 2.

TABLE 2

Parameter Estimates for PV Solar Energy Forecast Errors in 50 Hertz

| Variable | Estimated Coefficient | T Statistic | P Value |
| --- | --- | --- | --- |
| Constant | 171.3356 | 5.27 | <0.001 |
| ForecastedTemp | 6.524252 | 20.38 | <0.001 |
| ForecastedWindSpeed | −0.06951 | −1.02 | 0.309 |
| ForecastedHumidity | 0.133711 | 0.76 | 0.449 |
| ForecastedDewPoint | −7.10019 | −20.27 | <0.001 |
| ForecastedVisibility | −2.40133 | −6.68 | <0.001 |
| ForecastedProbPrecip | −0.43526 | −7.59 | <0.001 |
| ForecastedSolarGeneration | −0.03558 | −37.62 | <0.001 |
| ForecastedSunny | 4.867797 | 1.53 | 0.126 |
| ForecastedClearSky | −19.6879 | −5.56 | <0.001 |
| ForecastedMostlySunny | 3.094713 | 0.82 | 0.412 |
| ForecastedMostlyClear | −20.4879 | −3.89 | <0.001 |
| ForecastedHazy | −4.82311 | −0.41 | 0.684 |
| ForecastedPassingClouds | −15.6395 | −6.77 | <0.001 |
| ForecastedScatteredCloud | −4.45558 | −1.05 | 0.295 |

TABLE 2-continued

Parameter Estimates for PV Solar Energy Forecast Errors in 50 Hertz

| Variable | Estimated Coefficient | T Statistic | P Value |
| --- | --- | --- | --- |
| ForecastedPartlyCloudly | −9.87956 | −3.05 | 0.002 |
| ForecastedSunnCloudlyMix | 29.76685 | 4.57 | <0.001 |
| ForecastedHighLevelClouds | 13.6131 | 4.84 | <0.001 |
| ForecastedMoreCloudsthanSun | −24.679 | −8.45 | <0.001 |
| ForecastedPartlySunny | −8.88055 | −2.53 | 0.012 |
| ForecastedBrokenClouds | −13.7564 | −5.34 | <0.001 |
| ForecastedMostlyCloudly | −9.91977 | −4.64 | <0.001 |
| ForecastedCloudly | −18.9127 | −4.43 | <0.001 |
| ForecastedOvercast | −110.874 | −5.66 | <0.001 |
| ForecastedFoggy | −24.997 | −2.03 | 0.042 |
| ForecastedIcyFog | −16.7958 | −1.38 | 0.169 |
| R-Square (OLS) | 0.025 | | |
| Number of observations | 84,460 | | |

In embodiments of the present invention, a model for predicting solar energy generation is predicted based on the forecasted level of solar energy generation and forecasted weather conditions. An exemplary method in accordance with the embodiments of the present invention also utilizes binary variables for the hour of the day and the season.

In an embodiment of the present invention, a linear version of the model for predicting solar energy generation is represented by Equation (1):

$$ActualSolarEnergy = \qquad (1)$$
$$const + \alpha_1 ForecastedTemp + \alpha_2 ForecastedWindSpeed +$$
$$\alpha_3 ForecastedHumidity + \alpha_4 ForecastedDewPoint +$$
$$\alpha_5 ForecastedVisibility + \alpha_6 ForecastedProbPrecip +$$
$$\alpha_7 ForecastedSolarGeneration + \alpha_8 DayFSolarGeneration +$$
$$\alpha_9 Daylight + \sum_k \delta_k ForecastedSky_k + \sum_{i=2}^{24} \phi_i H_i + \sum_{j=2}^{73} \theta_j Season_j$$

where:

ActualSolarEnergy is the actual level of solar energy generation measured in MW;

ForecastedTemp is the day-ahead forecasted temperature measured in Kelvin;

ForecastedWindSpeed is the day-ahead forecasted wind speed;

ForecastedHumidity is the day-ahead forecasted humidity;

ForecastedDewPoint is the day-ahead forecasted dewpoint measured in Kelvin;

ForecastedVisibility is the day-ahead forecasted visibility;

ForecastedProbPrecip is the forecasted probability of precipitation represented as a percent;

ForecastedSolarGeneration is day-ahead forecasted level of solar energy generation;

Daylight is a binary variable that is equal to 1 if there is daylight (i.e., if the market period occurs between sunrise and sunset), and is 0 otherwise;

DayFSolarGeneration equals Daylight×ForecastedSolarGeneration;

ForecastedSky is a series of binary variables representing forecasted sky conditions;

Hour is a series of binary variables representing the hour of the day; and

Season is a series of binary variables representing the season. Exclusive of leap years, each of these binary variables represents five consecutive days. Thus, the variable Season represents 73 "seasons" over the course of a year.

The model represented by Equation (1) was estimated over the period Jan. 1, 2011 through Jun. 30, 2013. Thus, this model involves 84,460 observations in the sample period.

Equation (1) represents the model under the assumption of linearity. To test whether this assumption is justified, the dependent variable ActualSolarEnergy was transformed in a Box-Cox [1964, p. 214] procedure as follows using Equation (2):

$$TSolarEnergy = \begin{cases} (ActualSolarEnergy + \lambda_2)^{\lambda_1} - 1)/\lambda_1; \lambda_1 \neq 0 \\ \ln(ActualSolarEnergy + \lambda_2); \lambda_1 = 0 \end{cases} \quad (2)$$

where:

$\lambda_1$ is a parameter estimate obtained from the Box-Cox procedure.

$\lambda_2$ is a value that ensures that the left-hand side of equation (1) is positive. In this case, $\lambda_2$ was taken to be 1 MW.

The estimated value of $\lambda_1$ under the assumption of linearity in terms of the explanatory variables is −0.1490338. The corresponding p value equals 0.0000, thus leading to a conclusion that the Box-Cox analysis does not support a linear specification for the dependent variable ActualSolarEnergy.

In light of this finding, the issue of linearity in terms of the explanatory (i.e., independent) variables was then considered. In theory, this can be addressed using the multivariate Box-Cox method. But this method requires that all of the variables take on positive values, a requirement that is not satisfied by a number of the explanatory variables used in Equation (1). This shortcoming could be addressed by transforming each of the independent variables as was done for the dependent variable ActualSolarEnergy.

In exemplary embodiments of the present invention, a more straightforward multivariable fractional polynomial (MFP) model is applied. The MFP approach is a useful technique when one suspects that some or all of the relationships between the dependent variable and the explanatory (i.e., independent) variables are non-linear [Royston and Altman, 2008]. The MFP approach begins by estimating a model that is strictly linear in the explanatory variables. Subsequent estimations cycle through a battery of nonlinear transformations of the explanatory variables (e.g. cube roots, square roots, squares, cubes, etc.) until the MFP model that best predicts the dependent variable is found.

In embodiments of the present invention, the MFP analysis provided support for representing a number of the explanatory variables with powers other than unity. To ensure consistency between the Box-Cox parameter estimate $\lambda_1$ and the exponents recommended by the MFP approach, the two estimation techniques were iterated until the Box-Cox transformation of the dependent variable ActualSolarEnergy was consistent with the MFP transformations of the independent variables. This resulted in a revised value of −0.0097213 for $\lambda_1$ and MFP transformations of a number of the explanatory variables. For example, the MFP approach recommended an exponent of 3 for the independent variable ForecastedProbPrecip and a natural logarithmic specification for the independent variable ForecastedTemp.

An ordinary least squares (OLS) estimation of the transformed equation (i.e., Equation (2)) yields an estimated equation with an $R^2$ of about 0.9871. This indicates that the transformed equation is able to "explain" approximately 98.7% of the solar energy generation.

In exemplary embodiments, a regression equation, like the transformed equation, may be analyzed, for example using such techniques as autocorrelation, to determine any systematic errors. For example, the residual errors, or the difference between a predicted solar energy generation from a model, such as may be predicted using the transformed equation, and the actual solar energy, may be calculated.

Figure 10:
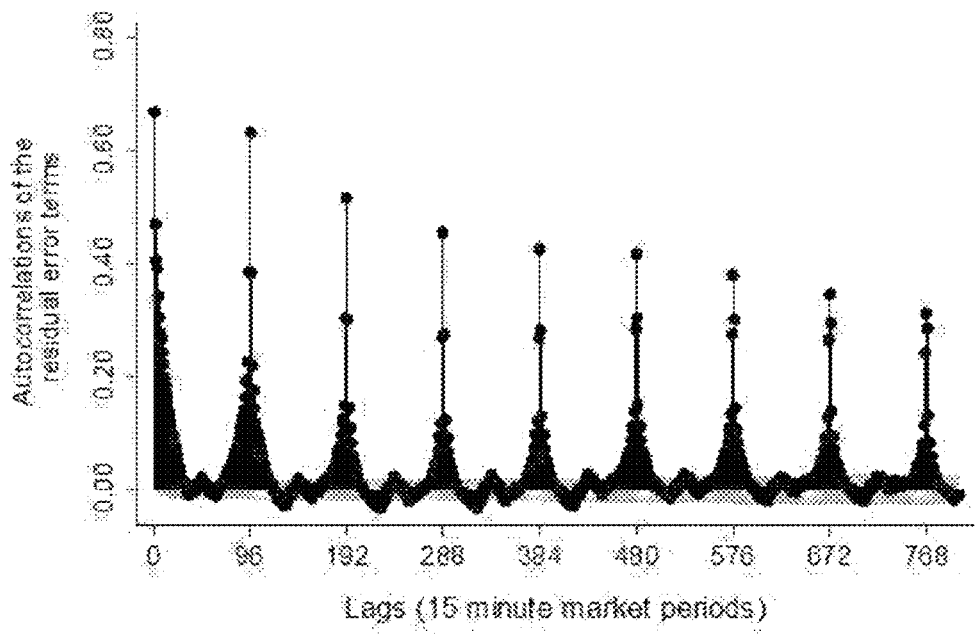
FIG. 10 is an illustration of a graph depicting an auto-correlation of residual errors in forecasted solar energy generation.

The residual errors may be further analyzed by calculating the autocorrelation of the residual errors. For example, the results of a calculation of the autocorrelation of the residual errors are shown in FIG. 10. FIG. 10 shows that, when the autocorrelation of the residual errors is plotted over time, a "hidden" pattern is revealed. In this case, the plot shows the residual errors being correlated, as indicated by a repeated series of peaks and valleys correlated with 15 minute market periods of energy trends of electric power utilization by users. In alternative embodiments, the peaks and valleys may correlate with hourly, daily, weekly, etc. energy trends of electric power utilization by users.

Generally, in embodiments, a regression analysis can be further applied to reduce the range of the residual errors to appear substantially as random noise, or "white noise". For example, in FIG. 10, the shaded gray area represents a "95% confidence band" under the null hypothesis of no autocorrelation. This area or band represents the range within which the residual errors should be substantially contained, thus reducing the effect of a systematic error.

In exemplary embodiments, the residual error terms from a postulated equation (such as the residual errors shown in FIG. 10) can be subjected to an autoregressive-moving-average with exogenous inputs model (ARMAX) to refine the original equation to reduce or eliminate systematic errors. The ARMAX model has two components. The first component is a structural component that is equivalent to the Box-Cox/MFP transformed equation discussed above.

The second component of the ARMAX model is an autoregressive-moving average (ARMA) component that models the dependency of the solar energy generation outcome at time period t on the solar energy generation outcomes in previous time periods as a combination of two processes. In exemplary embodiments, the residual errors are subjected to an ARMA analysis to refine the original equation to reduce or eliminate systematic errors.

In an ARMA model, the disturbances (i.e., the differences between the predicted and actual value of the one or more dependent variables) have a linear autoregressive moving-average (ARMA) specification over the period in which the model is estimated. In the simple case of an ARMA (1,1) model, a residual error term $u_t$ in a period t depends on the residual error term $u_{t-1}$ in the previous period t−1, on a measure of the "pure" error in period t, $\varepsilon_t$, and on a weighted measure of the pure error term in period t−1, $\beta_1 * \varepsilon_{t-1}$, where $\beta_1$ is an estimated parameter. These calculations can be programmed to be performed by a computer.

In embodiments of the present invention, the first process of the ARMA component is an autoregressive (AR) process in which the disturbances tend to oscillate in 96 market period increments (with each market period being 15 minutes in duration). For the AR(p) process, the modeled lag lengths are p=1 through 6, 94 through 98, and 190 through 194. The second process of the ARMA component is the moving-average (MA) process. For the MA(q) process, the modeled lag lengths are q=1 through 6, 94 through 98, and 190 through 194.

Selected parameter estimates for the prediction of solar energy generation in the region of Germany served by 50 Hertz in accordance with embodiments of the present invention are shown in Table 3. It should be noted that the coefficient corresponding to the variable ln(ForecastedTemp) is nontrivial in magnitude and is also highly statistically significant. Other statistically significant variables shown in Table 3 include ForecastedWindSpeed, ForecastedProbPrecip, ln(ForecastedSolarGeneration+1), ln(DayFSolarGeneration+1), ForecastedSunny, ForecastedClearSky, ForecastedMostlyClear, ForecastedHazy, ForecastedPassingClouds, ForecastedMoreCloudsthanSun, ForecastedPartlySunny, ForecastedBrokenClouds, and ForecastedMostlyCloudly.

Figure 11:
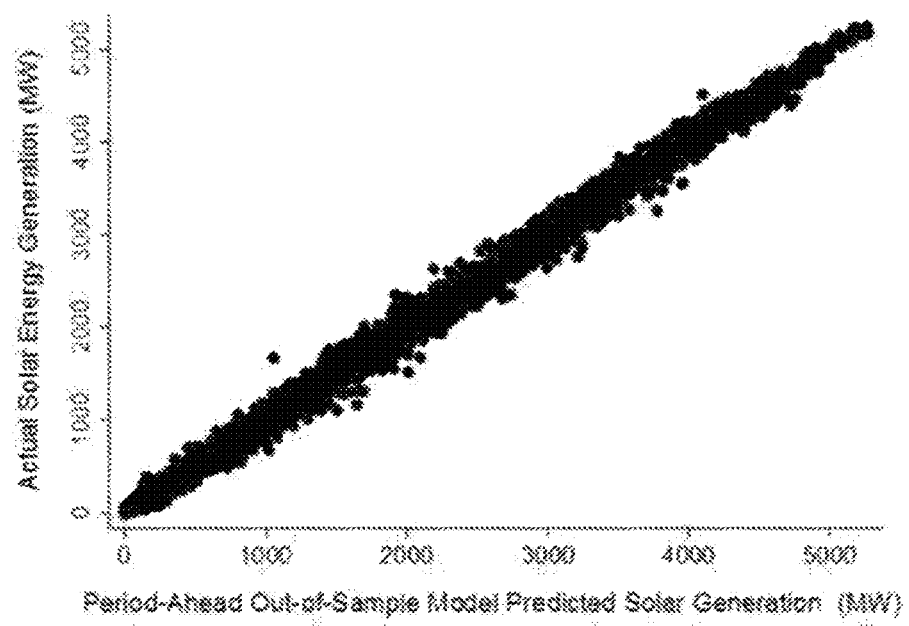
FIG. 11 is a scatter diagram illustrating an exemplary relationship between actual solar energy and an out-of-sample econometrically modified solar energy forecast, as published by 50 Hertz, for the period Jul. 1, 2013-Mar. 3, 2014.
Figure 12:
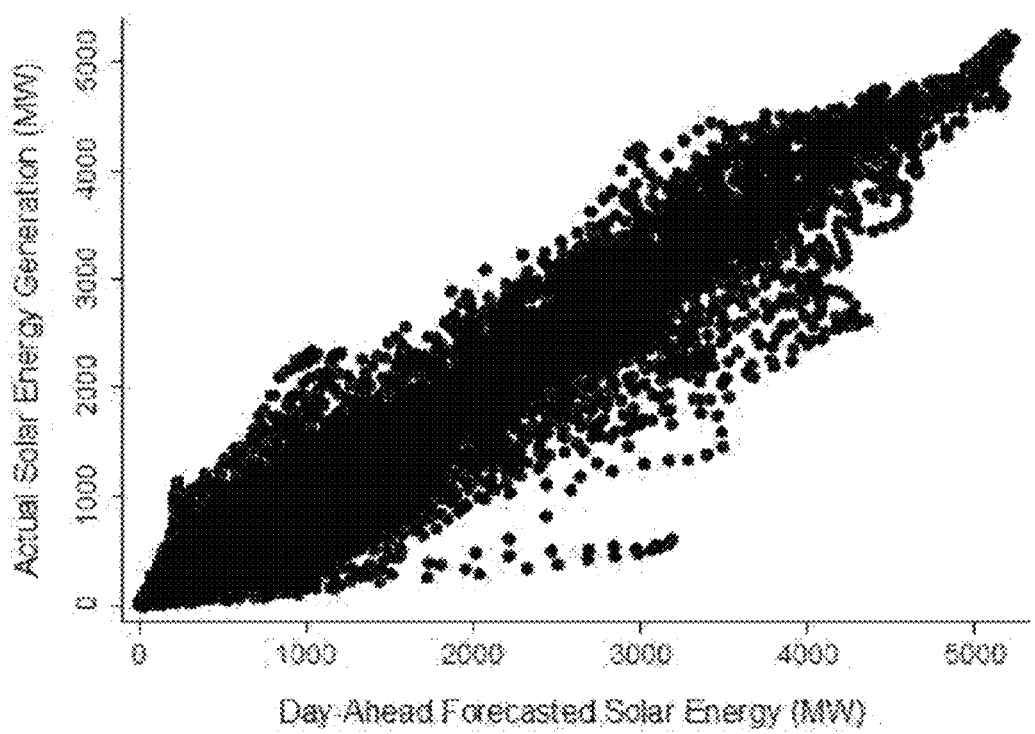
FIG. 12 is a scatter diagram illustrating an exemplary relationship between actual and day-ahead forecasted solar energy, as published by 50 Hertz, for the period Jul. 1, 2013-Mar. 3, 2014.

The predictive power of the estimated equation was evaluated over the period Jul. 1, 2013 through Mar. 3, 2014. Referring to FIG. 11, over the daylight portion of this evaluation period, the estimated equation yielded a period-ahead forecast with an energy weighted RMSE of about 4.8 percent and a MSESS of 0.768. Referring to FIG. 12, for this same period, 50 Hertz's day-ahead forecast had an energy weighted RMSE of about 26.2 percent and a MSESS of −5.9.

TABLE 3

Selected Parameter Estimates for PV Solar Energy Generation in 50 Hertz

| Variable | Estimated Coefficient | T Statistic | P Value |
|---|---|---|---|
| Constant | −0.01318 | −0.01 | 0.993 |
| ln(ForecastedTemp) | 1.433661 | 3.19 | 0.001 |
| ForecastedWindSpeed | −0.001 | −2.19 | 0.029 |
| ln(ForecastedHumidity) | 0.023133 | 0.78 | 0.438 |
| ln(ForecastedDewPoint) | −0.78434 | −1.22 | 0.224 |
| ln(forecastedVisibility) | 0.003931 | 1.44 | 0.151 |
| ForecastedProbPrecip | −0.06095 | −2.17 | 0.03 |
| ln(ForecastedSolarGeneration + 1) | 0.10459 | 16.18 | <0.001 |
| ln(DayFSolarGeneration + 1) | 0.208044 | 30.36 | <0.001 |
| ForecastedSunny | 0.010218 | 2.69 | 0.007 |
| ForecastedClearSky | −0.02755 | −2.76 | 0.006 |
| ForecasteclMostlySunny | 0.001867 | 0.65 | 0.515 |
| ForecastedMostlyClear | −0.02853 | −2.52 | 0.012 |
| ForecastedHazy | −0.04674 | −2.37 | 0.018 |
| ForecastedPassingClouds | −0.01632 | −3.45 | 0.001 |
| ForecastedScatteredCloud | 0.00058 | 0.18 | 0.859 |
| ForecastedPartlyCloudly | −0.00065 | −0.27 | 0.787 |
| ForecastedSunnCloudlyMix | −0.0009 | −0.18 | 0.854 |
| ForecastedHighLevelClouds | −0.00164 | −0.57 | 0.568 |
| ForecastedMoreCloudsthanSun | −0.00986 | −3.69 | <0.001 |
| ForecastedPartlySunny | −0.00737 | −2.53 | 0.011 |
| ForecastedBrokenClouds | −0.01068 | −3.1 | 0.002 |
| ForecastedMostlyCloudly | −0.00671 | −2.54 | 0.011 |
| ForecastedCloudly | −0.00671 | −1.37 | 0.171 |
| ForecastedOvercast | −0.00966 | −0.55 | 0.58 |
| ForecastedFoggy | −0.04882 | −1.72 | 0.085 |
| ForecastedIcyFog | 5.16E−05 | 0 | 0.999 |
| Daylight | −0.2075 | −14.67 | <0.001 |
| R-Square (OLS) | 0.9871 | | |
| R-Square (ARMA) | 0.9982 | | |
| Number of observations | 84,460 | | |

Figure 13:
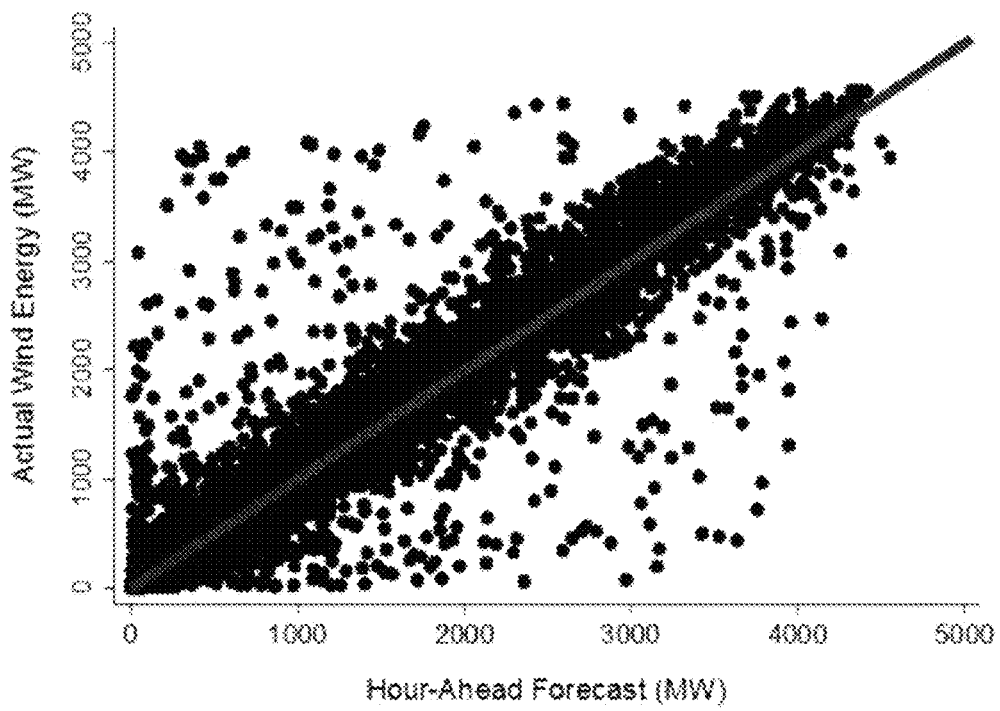
FIG. 13 is a scatter diagram illustrating an exemplary relationship between actual wind energy and the hour-ahead forecast of wind energy, as published by BPA, for the period Sep. 1, 2014-May 31, 2015.
Figure 14:
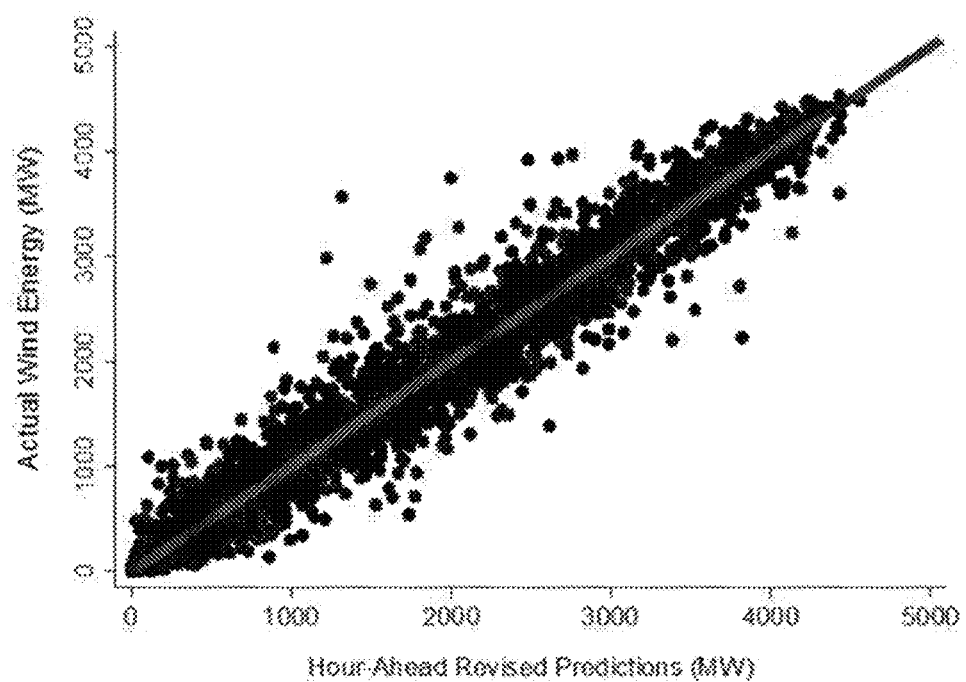
FIG. 14 is a scatter diagram illustrating an exemplary relationship between actual wind energy and the hour-ahead revised prediction of wind energy, as published by BPA, for the period Sep. 1, 2014-May 31, 2015.

In embodiments of the present invention, significant out-of-sample improvements have been achieved in the forecast of wind energy in BPA, Western Denmark, Great Britain, CAISO, and MISO. For example, FIGS. 13 and 14 depict the results for BPA over the period Sep. 1, 2014 through May 31, 2015. Referring to FIG. 13, the MSESS for BPA's hour-ahead Average forecast is −2.2. The MSESS's are −3.77 and −4.65 for BPA's hour-ahead Maximum and Minimum forecasts, respectively. Referring to FIG. 14, the revised forecast has an MSESS of 0.164.

Figure 15:
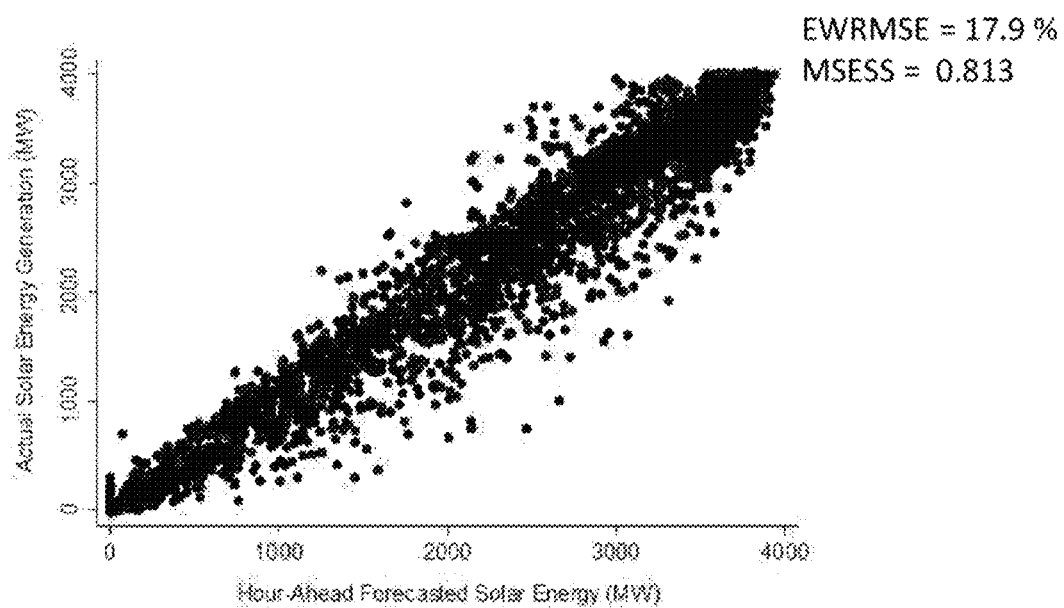
FIG. 15 is a scatter diagram illustrating an exemplary relationship between actual and hour-ahead forecasted solar energy, as published by the California Independent System Operator (CAISO), for the period Jan. 1, 2015-Sep. 30, 2015.
Figure 16:
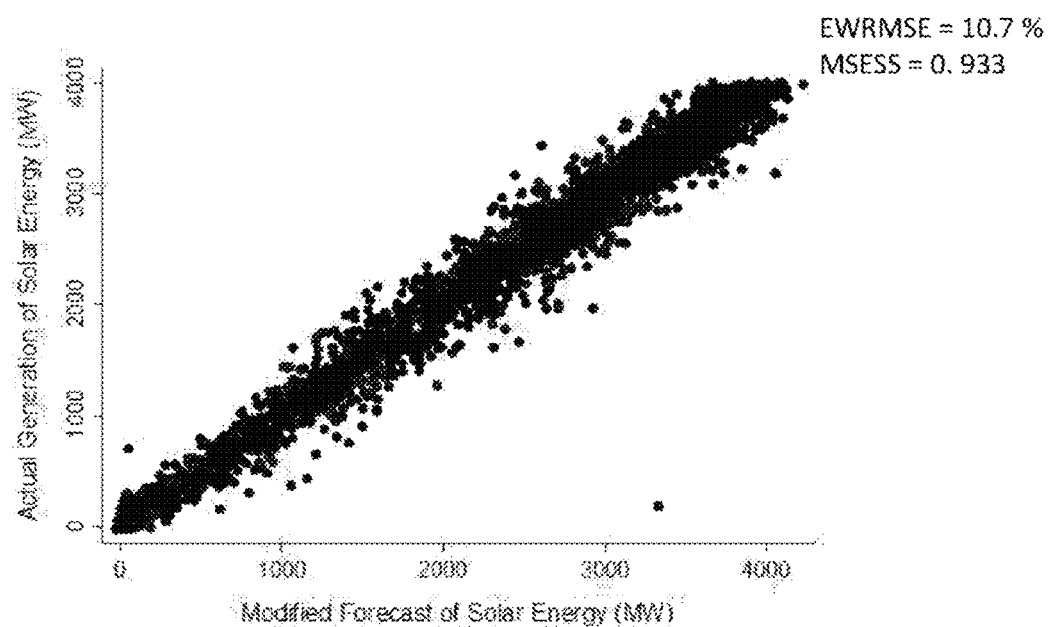
FIG. 16 is a scatter diagram illustrating an exemplary relationship between actual solar energy and a revised solar energy forecast, as published by CAISO, for the period Jan. 1-Sep. 30, 2015.

Embodiments of the present invention have also been applied to the forecast of solar energy generation in CAISO, with significant improvements. FIG. 15 shows the results for actual and hour-ahead forecasted solar energy for SP15 of CAISO (the zone corresponding to southern California) for the period Jan. 1-Sep. 30, 2015. The data shown in FIG. 15 have an EWRMSE of 17.9% and an MSESS of 0.813. FIG. 16 shows the results for the same time period with a revised forecasted solar energy in accordance with embodiments of the present invention. The data shown in FIG. 16 have a significantly improved EWRMSE of 10.7% and a significantly improved MSESS of 0.933.

Referring back to FIG. 1, the renewably energy generation forecast computer system 1200 provides revised renewable energy forecasts and revised load forecasts to the energy management computer system 1600 so that the energy management computer system 1600 can generate revised instructions to the various utilities within the grid based on the revised renewable energy and load forecasts. In this regard, the energy management computer system 1600 may receive an alert from the renewable energy generation forecast computer system 1200 indicating that a change in meteorological conditions has resulted in renewable energy forecasts that are revised beyond a specified threshold as compared to prior generated forecasts. The alert may then activate a utilities instruction application within the energy management computer system 1600 to generate revised instructions to conventional and/or renewable energy generators within the grid based on the revised forecasts.

The renewable energy generation forecast computer system 1200 may generate revised load forecasts, revised wind energy forecasts and revised solar energy forecasts based on input data. The revised load forecast may be generated by taking into account factors such as, for example, short run economic variables, the prior forecasted load and the day-ahead electricity market outcome, to name a few. Systems and method for generating revised load forecasts based on such variables are explained in detail in U.S. patent application Ser. No. 13/438,936, the contents of which are incorporated herein by reference in their entirety. The renewable energy generation forecast computer system 1200 generates revised wind and/or solar energy forecasts based on forecasted meteorological data, the prior forecasted wind and/or solar energy, a number of binary variables representing both the season and period of the day, and time-series variables that account for systematic patterns in the energy/weather system. In exemplary embodiments, the revised wind and/or solar energy forecasts may be determined using the following formula:

$$y_t = x_t\beta + \Sigma_{j=1}^{P}\rho_j\{y_{t-j} - x_{t-j}\beta\} + \Sigma_{k=1}^{q}\vartheta_k\epsilon_{t-k} + \epsilon_t \qquad (3)$$

where y is the Box-Cox transformed measure of the renewable energy production (e.g., the natural logarithm of renewable energy generation), x is a MFP transformed vector of explanatory variables (e.g., forecasted temperature raised to the third power), β is a vector of the structural parameters (e.g., the coefficient on forecasted humidity), $\rho_j$ are autoregressive parameters, $\vartheta_k$ are moving average parameters, and $\epsilon_{t-k}$ is a residual error term for period t-k.

The revised load forecast and revised wind and/or solar energy forecasts are input to or retrieved by the energy management computer system 1600, where such data may be used to generate revised control instructions to various conventional and renewable energy generators within the grid. The energy management computer system 1600 may then distribute the control instructions to one or more of the generators to achieve a more efficient spread of load and energy generation across the system. In this regard, according to an exemplary embodiment, the energy management computer system 1600 may make control adjustments when only certain criteria are met, such as, for example, when the original control instructions deviate from the revised control instructions beyond a specified threshold. The revised instructions may include instructions to the conventional generators to increase energy production when the system is "short" and/or to decrease energy production when the system is "long", and/or instructions to the renewable energy generators to decrease energy production when the system is "long".

Figure 6:
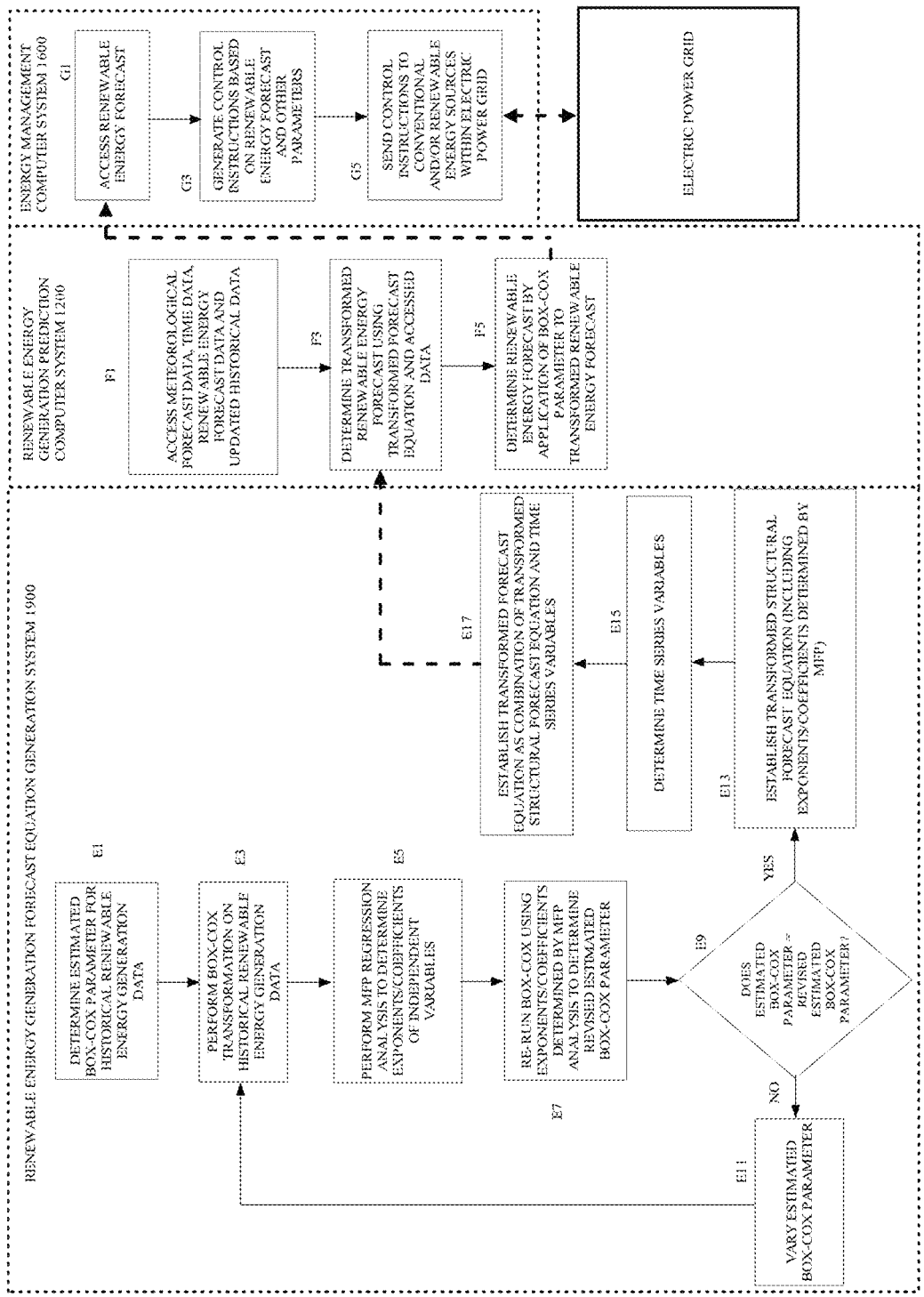
FIG. 6 is a flowchart illustrating a process for generating a renewable energy generation forecast and controlling an electric power grid based on the forecast according to an exemplary embodiment of the present invention.

FIG. 6 is a flowchart showing a process for controlling an electric power grid based on refined renewable energy forecasts according to an exemplary embodiment of the present invention, where the forecasts are obtained through interactions between a renewable energy generation forecast equation computer system 1900, the renewable energy generation prediction computer system 1200, the energy management computer system 1600 and the electric power grid 2000 and use of historic and forecasted data (e.g., historic/forecasted meteorological data, historic/forecasted renewal energy generation data and corresponding historic/forecasted time data), resulting in improved efficiency of the electric power grid 2000 in terms of loading and generation of energy, and consequently improving economic variables and environmental effects associated with the overall grid system. For example, as a result of the refined renewable energy forecasts, the process shown in FIG. 6 may reduce intermittency issues inherent to solar energy and wind energy so as to allow for improvements in balancing of supply and demand of electricity.

Turning now to the process flow, in step E1, the forecast equation generation computer system 1900 estimates a Box-Cox parameter for the historical renewable energy generation data. Such data may be obtained over a period of days, months or years, and reflects the actual renewable energy generation as measured over the selected time period. The measurements may be obtain by, for example, feedback from sensors at the renewable energy sources within the electric power grid. The Box-Cox parameter is estimated by performing a Box-Cox analysis on a structural equation that includes the historical renewable energy generation data as a dependent variable and the historical forecasted meteorological conditions data, the historical forecasted renewable energy generation data and the corresponding historical time data as independent variables. In an exemplary embodiment, the structural equation has the same general form as that show in equation (1), although in this step the historical data is used as inputs.

Next, in step E3, the forecast equation generation computer system 1900 performs a Box-Cox transformation of the historical renewable energy generation data using the estimated Box-Cox parameter from step E1.

In step E5, the forecast equation generation computer system 1900 then performs an MFP analysis on the structural equation using the transformed energy generation data as a dependent variable to determine exponents and coefficients for the independent variables.

Next, in step E7, the forecast equation generation computer system 1900 performs a subsequent Box-Cox analysis of the structural equation using the historical renewable energy data as a dependent variable and the historical forecasted meteorological conditions data, the historical forecasted renewable energy generation data and the historical time data as independent variables with the exponents/coefficients as determined by the MFP analysis so as to determine a revised estimated Box-Cox parameter. The forecast equation generation computer system 1900, in step E9, then determines whether the estimated Box-Cox parameter is equal to the estimated Box-Cox parameter (or, in an alternative embodiment, determines whether the two values are within a specified range of one another). If so, the process proceeds to step E13, where the forecast equation generation computer system 1900 generates a transformed structural equation for the renewable energy forecast, where the transformed structural equation is based on the revised estimated Box-Cox parameter and the corresponding independent variables that have been transformed using the MFP analysis.

If the Box-Cox parameters do not match, then the process continues to step E11, where the estimated Box-Cox parameter is varied, and the process flow loops back to step E3. The process will then iterate until there is a match between the varied estimated Box-Cox parameter and the revised estimated Box-Cox parameter obtained by re-running the Box-Cox analysis after the MFP analysis.

Assuming that the forecast equation generation computer system 1900 has established the transformed structural forecast equation in step E14, the process will then continue to step E15, where a time-series analysis is performed on the transformed structural forecast equation to determine associated time series variables. This step also results in revisions of the coefficients for the independent variables in the equation. The number of obtained time series variables is preferably 50 or greater, although in other exemplary embodiments the number may be less, such as, for example, 20 or greater, or 30 or greater, or 40 or greater.

Next, in step E17, the forecast equation generation computer system 1900 establishes the transformed forecast equation as a combination of the transformed structural forecast equation and the time series variables.

It should be appreciated that the process steps E1-E17 may be performed on a periodic basis, such as, for example, on a monthly or yearly basis, so as to ensure the accuracy of the transformed structural forecast equation by taking into account the most recent historical data. It also should be appreciated that the forecast equation generation computer system 1900 may be a separate system from the renewable energy generation prediction computer system 1200, or may be a module integrated with the renewable energy generation prediction computer system 1200.

In step F1, the renewable energy generation prediction computer system 1200 may access meteorological forecast data, time data, renewable energy forecast data (as obtained from the energy management computer system 1600) and updated historical data, so that, as shown in step F3, such data may be applied to the transformed forecast equation to determine a transformed renewable energy forecast. Next, in step F5, the renewable energy generation prediction computer system 1200 determines a renewable energy forecast by application of the Box-Cox parameter determined by steps E1-E9 to the transformed renewable energy forecast.

Next, in step G1, the energy management computer system 1600 may access the renewable energy forecast determined in step F5, and use the forecast as well as other control parameters in step G3 to generate control instructions for the various energy sources within the electric power grid. In step G5, the control instructions may be sent to various conventional and/or renewable energy sources within the electric power grid.

Now that exemplary embodiments of the present disclosure have been shown and described in detail, various modifications and improvements thereon will become readily apparent to those skilled in the art. As can be appreciated, the system and methods described herein are exemplary, and various combinations of variables may be used in solar energy and wind energy generation forecast equations. In exemplary embodiments, forecast equations using this modeling approach may vary across different electricity markets and may, for example, include different variables, coefficients, and/or exponents.

The invention claimed is:

1. A method comprising:
(A) accessing, by one or more computers, one or more electronic databases, stored on one or more computer readable media, the one or more databases comprising:
  (i) forecasted meteorological conditions data associated with forecasted meteorological conditions of a geographical area encompassing an electric power grid;
  (ii) forecasted renewable energy generation data associated with one or more sources of renewable energy within the electric power grid as obtained from an energy management computer system associated with the electric power grid;
  (iii) time data comprising at least one of time of day data or season data associated with the electric power grid;
  (iv) historical data comprising historical renewable energy generation data, historical forecasted meteorological conditions data, historical forecasted renewable energy generation data and historical time data corresponding to the historical forecasted meteorological conditions data and historical forecasted renewable energy generation data;
(B) calculating, by the one or more computers, a renewable energy generation forecast based on the forecasted meteorological conditions data, the forecasted renewable energy generation data, the time data and time-series variables determined based on the historical data, wherein the calculating step comprises:
  (i) calculating, by the one or more computers, a transformed forecast of renewable energy generation by inputting the forecasted meteorological conditions data, the forecasted renewable energy generation data and the time data to a transformed renewable energy forecast equation, the transformed renewable energy forecast equation having been derived at a forecast equation module as follows:
    1) determining, by the forecast equation module, an estimated Box-Cox parameter associated with the historical renewable energy generation data by performing an initial Box-Cox analysis on a structural equation comprising the historical renewable energy generation data as a dependent variable and the historical forecasted meteorological conditions data, the historical forecasted renewable energy generation data and the historical time data as independent variables;
    2) performing, by the forecast equation module, a Box-Cox transformation of the historical renewable energy generation data using the estimated Box-Cox parameter;
    3) performing, by the forecast equation module, a multivariable fractional polynomial analysis on the structural equation using the transformed historical renewable energy generation data as a dependent variable to determine exponents for the independent variables;
    4) performing, by the forecast equation module, a subsequent Box-Cox analysis of the structural equation using the historical renewable energy generation data as a dependent variable and the historical forecasted meteorological conditions data, the historical forecasted renewable energy generation data and the historical time data as independent variables with the exponents as determined by the multivariable fractional polynomial analysis so as to determine a revised estimated Box-Cox parameter;
    5) determining, by the forecast equation module, whether the estimated Box-Cox parameter is equal to the revised estimated Box-Cox parameter;
    6) upon the condition that the estimated Box-Cox parameter is not equal to the revised estimated Box-Cox parameter, replacing, by the forecast equation module, the estimated Box-Cox parameter with the revised estimated Box-Cox parameter and iterating back to step 4);
    7) upon the condition that the estimated Box-Cox parameter is equal to the revised estimated Box-Cox parameter, generating, by the forecast equation module, a transformed structural equation for the renewable energy forecast, where the transformed structural equation is based on the revised estimated Box-Cox parameter and the independent variables with the exponents as determined by the multivariable fraction polynomial analysis;
    8) determining, by the forecast equation module, a plurality of time series variables associated with the transformed structural equation by performing a time series analysis of the transformed structural equation; and
    9) generating, by the forecast equation module, the transformed renewable energy forecast equation as a combination of the transformed structural equation and the plurality of time series variables;
  (ii) calculating, by the one or more computers, a transformed renewable energy generation forecast using the transformed structural equation; and
  (iii) calculating, by the one or more computers, an untransformed renewable energy generation forecast by applying the revised estimated Box-Cox parameter to the calculated transformed renewable energy generation forecast; and
C) providing, by the one or more computers, to an energy management computer system, the untransformed renewable energy generation forecast for generation of a schedule of conventional and renewable energy generation within the electric power grid.

2. The method of claim 1, wherein the forecasted meteorological conditions comprises one or more of the following: day-ahead forecasted temperature; day-ahead forecasted wind speed; day-ahead forecasted humidity; day-ahead forecasted dewpoint; day-ahead forecasted visibility; forecasted probability of precipitation; and forecasted sky conditions.

3. The method of claim 1, wherein the forecasted renewable energy generation data comprises one or more of the following: day-ahead or period-ahead forecasted level of renewable energy generation and day-ahead forecasted level of renewable energy by season.

4. The method of claim 1, wherein the time data comprises at least one of seconds, minutes, hours or season.

5. The method of claim 1, wherein the renewable energy is at least one of solar energy or wind energy.

6. The method of claim 1, wherein the plurality of time series variables comprises 20 or more time series variables.

7. The method of claim 1, wherein the plurality of time series variables comprises 50 or more time series variables.

8. The method of claim 1, wherein the transformed renewable energy forecast equation is:

$$y_t = x_t\beta + \Sigma_{j=1}^{p}\rho_j\{y_{t-j} - x_{t-j}\beta\} + \Sigma_{k=1}^{q}\theta_k\epsilon_{t-k} + \epsilon_t$$

where y is the Box-Cox transformed measure of the renewable energy production, x is a MFP transformed vector of explanatory variables, p and q are modeled lag lengths β is a vector of the structural parameters, $\rho_j$ are autoregressive parameters, $\theta_k$ are moving average parameters, and $\epsilon_{t-k}$ is a residual error term for period t-k.

9. A system, comprising:
one or more data processing apparatus; and
a computer-readable medium coupled to the one or more data processing apparatus having instructions stored thereon which, when executed by the one or more data processing apparatus, cause the one or more data processing apparatus to perform a method comprising:
(A) accessing, by one or more computers, one or more electronic databases, stored on one or more computer readable media, the one or more databases comprising:
  (i) forecasted meteorological conditions data associated with forecasted meteorological conditions of a geographical area encompassing an electric power grid;
  (ii) forecasted renewable energy generation data associated with one or more sources of renewable energy within the electric power grid as obtained from an energy management computer system associated with the electric power grid;
  (iii) time data comprising at least one of time of day data or season data associated with the electric power grid;
  (iv) historical data comprising historical renewable energy generation data, historical forecasted meteorological conditions data, historical forecasted renewable energy generation data and historical time data corresponding to the historical forecasted meteorological conditions data and historical forecasted renewable energy generation data;
(B) calculating, by the one or more computers, a renewable energy generation forecast based on the forecasted meteorological conditions data, the forecasted renewable energy generation data, the time data and time-series variables determined based on the historical data, wherein the calculating step comprises:
  (i) calculating, by the one or more computers, a transformed forecast of renewable energy generation by inputting the forecasted meteorological conditions data, the forecasted renewable energy generation data and the time data to a transformed renewable energy forecast equation, the transformed renewable energy forecast equation having been derived at a forecast equation module as follows:
    1) determining, by the forecast equation module, an estimated Box-Cox parameter associated with the historical renewable energy generation data by performing an initial Box-Cox analysis on a structural equation comprising the historical renewable energy generation data as a dependent variable and the historical forecasted meteorological conditions data, the historical forecasted renewable energy generation data and the historical time data as independent variables;
    2) performing, by the forecast equation module, a Box-Cox transformation of the historical renewable energy generation data using the estimated Box-Cox parameter;
    3) performing, by the forecast equation module, a multivariable fractional polynomial analysis on the structural equation using the transformed historical renewable energy generation data as a dependent variable to determine exponents for the independent variables;
    4) performing, by the forecast equation module, a subsequent Box-Cox analysis of the structural equation using the historical renewable energy generation data as a dependent variable and the historical forecasted meteorological conditions data, the historical forecasted renewable energy generation data and the historical time data as independent variables with the exponents as determined by the multivariable fractional polynomial analysis so as to determine a revised estimated Box-Cox parameter;
    5) determining, by the forecast equation module, whether the estimated Box-Cox parameter is equal to the revised estimated Box-Cox parameter;
    6) upon the condition that the estimated Box-Cox parameter is not equal to the revised estimated Box-Cox parameter, replacing, by the forecast equation module, the estimated Box-Cox parameter with the revised estimated Box-Cox parameter and iterating back to step 4);
    7) upon the condition that the estimated Box-Cox parameter is equal to the revised estimated Box-Cox parameter, generating, by the forecast equation module, a transformed structural equation for the renewable energy forecast, where the transformed structural equation is based on the revised estimated Box-Cox parameter and the independent variables with the exponents as determined by the multivariable fraction polynomial analysis;
    8) determining, by the forecast equation module, a plurality of time series variables associated with the transformed structural equation by performing a time series analysis of the transformed structural equation; and
    9) generating, by the forecast equation module, the transformed renewable energy forecast equation as a combination of the transformed structural equation and the plurality of time series variables;
  (ii) calculating, by the one or more computers, a transformed renewable energy generation forecast using the transformed structural equation; and
  (iii) calculating, by the one or more computers, an untransformed renewable energy generation forecast by applying the revised estimated Box-Cox parameter to the calculated transformed renewable energy generation forecast; and
C) providing, by the one or more computers, to an energy management computer system, the untransformed renewable energy generation forecast for generation of a schedule of conventional and renewable energy generation within the electric power grid.

10. The system of claim 9, wherein the forecasted meteorological conditions comprises one or more of the following: day-ahead forecasted temperature; day-ahead forecasted wind speed; day-ahead forecasted humidity; day-ahead forecasted dewpoint; day-ahead forecasted visibility; forecasted probability of precipitation; and forecasted sky conditions.

11. The system of claim 9, wherein the forecasted renewable energy generation data comprises one or more of the following: day-ahead or period-ahead forecasted level of renewable energy generation and day-ahead forecasted level of renewable energy by season.

12. The system of claim 9, wherein the time data comprises at least one of seconds, minutes, hours or season.

13. The system of claim 9, wherein the renewable energy is at least one of solar energy or wind energy.

14. The system of claim 9, wherein the plurality of time series variables comprises 20 or more time series variables.

15. The system of claim 9, wherein the plurality of time series variables comprises 50 or more time series variables.

16. The system of claim 9, wherein the transformed renewable energy forecast equation is:

$$y_t = x_t\beta + \Sigma_{j=1}^{p}\rho_j\{y_{t-j} - x_{t-j}\beta\} + \Sigma_{k=1}^{q}\theta_k\epsilon_{t-k} + \epsilon_t$$

where y is the Box-Cox transformed measure of the renewable energy production, x is a MFP transformed vector of explanatory variables, p and q are modeled lag lengths, $\beta$ is a vector of the structural parameters, $\rho_j$ are autoregressive parameters, $\theta_k$ are moving average parameters, and $\epsilon_{t-k}$ is a residual error term for period t-k.

17. A method comprising:
(A) accessing, by one or more computers, a renewable energy forecast, wherein the renewable energy forecast is determined by:
  (i) accessing, by the one or more computers, one or more electronic databases, stored on one or more computer readable media, the one or more databases comprising:
    (1) forecasted meteorological conditions data associated with forecasted meteorological conditions of a geographical area encompassing an electric power grid;
    (2) forecasted renewable energy generation data associated with one or more sources of renewable energy within the electric power grid as obtained from an energy management computer system associated with the electric power grid;
    (3) time data comprising at least one of time of day data or season data associated with the electric power grid;
    (4) historical data comprising historical renewable energy generation data, historical forecasted meteorological conditions data, historical forecasted renewable energy generation data and historical time data corresponding to the historical forecasted meteorological conditions data and historical forecasted renewable energy generation data;
  (ii) calculating, by the one or more computers, a renewable energy generation forecast based on the forecasted meteorological conditions data, the forecasted renewable energy generation data, the time data and time-series variables determined based on the historical data, wherein the calculating step comprises:
    (1) calculating, by the one or more computers, a transformed forecast of renewable energy generation by inputting the forecasted meteorological conditions data, the forecasted renewable energy generation data and the time data to a transformed renewable energy forecast equation, the transformed renewable energy forecast equation having been derived at a forecast equation module as follows:
      a) determining, by the forecast equation module, an estimated Box-Cox parameter associated with the historical renewable energy generation data by performing an initial Box-Cox analysis on a structural equation comprising the historical renewable energy generation data as a dependent variable and the historical forecasted meteorological conditions data, the historical forecasted renewable energy generation data and the historical time data as independent variables;
      b) performing, by the forecast equation module, a Box-Cox transformation of the historical renewable energy generation data using the estimated Box-Cox parameter;
      c) performing, by the forecast equation module, a multivariable fractional polynomial analysis on the structural equation using the transformed historical renewable energy generation data as a dependent variable to determine exponents for the independent variables;
      d) performing, by the forecast equation module, a subsequent Box-Cox analysis of the structural equation using the historical renewable energy generation data as a dependent variable and the historical forecasted meteorological conditions data, the historical forecasted renewable energy generation data and the historical time data as independent variables with the exponents as determined by the multivariable fractional polynomial analysis so as to determine a revised estimated Box-Cox parameter;
      e) determining, by the forecast equation module, whether the estimated Box-Cox parameter is equal to the revised estimated Box-Cox parameter;
      f) upon the condition that the estimated Box-Cox parameter is not equal to the revised estimated Box-Cox parameter, replacing, by the forecast equation module, the estimated Box-Cox parameter with the revised estimated Box-Cox parameter and iterating back to step 4);
      g) upon the condition that the estimated Box-Cox parameter is equal to the revised estimated Box-Cox parameter, generating, by the forecast equation module, a transformed structural equation for the renewable energy forecast, where the transformed structural equation is based on the revised estimated Box-Cox parameter and the independent variables with the exponents as determined by the multivariable fraction polynomial analysis;
      h) determining, by the forecast equation module, a plurality of time series variables associated with the transformed structural equation by performing a time series analysis of the transformed structural equation; and
      i) generating, by the forecast equation module, the transformed renewable energy forecast equation as a combination of the transformed structural equation and the plurality of time series variables;

(2) calculating, by the one or more computers, a transformed renewable energy generation forecast using the transformed structural equation; and
(3) calculating, by the one or more computers, an untransformed renewable energy generation forecast as the renewable energy generation forecast by applying the revised estimated Box-Cox parameter to the calculated transformed renewable energy generation forecast; and
B) generating, by the one or more computers, control instructions based on the renewable energy generation forecast; and
C) sending, by the one or more computers, the control instructions to one or more conventional or renewably energy sources within the electric power grid.

18. A system comprising:
one or more data processing apparatus; and
a computer-readable medium coupled to the one or more data processing apparatus having instructions stored thereon which, when executed by the one or more data processing apparatus, cause the one or more data processing apparatus to perform a method comprising:
(A) accessing, by one or more computers, a renewable energy forecast, wherein the renewable energy forecast is determined by:
 (i) accessing, by the one or more computers, one or more electronic databases, stored on one or more computer readable media, the one or more databases comprising:
  (1) forecasted meteorological conditions data associated with forecasted meteorological conditions of a geographical area encompassing an electric power grid;
  (2) forecasted renewable energy generation data associated with one or more sources of renewable energy within the electric power grid as obtained from an energy management computer system associated with the electric power grid;
  (3) time data comprising at least one of time of day data or season data associated with the electric power grid;
  (4) historical data comprising historical renewable energy generation data, historical forecasted meteorological conditions data, historical forecasted renewable energy generation data and historical time data corresponding to the historical forecasted meteorological conditions data and historical forecasted renewable energy generation data;
 (ii) calculating, by the one or more computers, a renewable energy generation forecast based on the forecasted meteorological conditions data, the forecasted renewable energy generation data, the time data and time-series variables determined based on the historical data, wherein the calculating step comprises:
  (1) calculating, by the one or more computers, a transformed forecast of renewable energy generation by inputting the forecasted meteorological conditions data, the forecasted renewable energy generation data and the time data to a transformed renewable energy forecast equation, the transformed renewable energy forecast equation having been derived at a forecast equation module as follows:
   a) determining, by the forecast equation module, an estimated Box-Cox parameter associated with the historical renewable energy generation data by performing an initial Box-Cox analysis on a structural equation comprising the historical renewable energy generation data as a dependent variable and the historical forecasted meteorological conditions data, the historical forecasted renewable energy generation data and the historical time data as independent variables;
   b) performing, by the forecast equation module, a Box-Cox transformation of the historical renewable energy generation data using the estimated Box-Cox parameter;
   c) performing, by the forecast equation module, a multivariable fractional polynomial analysis on the structural equation using the transformed historical renewable energy generation data as a dependent variable to determine exponents for the independent variables;
   d) performing, by the forecast equation module, a subsequent Box-Cox analysis of the structural equation using the historical renewable energy generation data as a dependent variable and the historical forecasted meteorological conditions data, the historical forecasted renewable energy generation data and the historical time data as independent variables with the exponents as determined by the multivariable fractional polynomial analysis so as to determine a revised estimated Box-Cox parameter;
   e) determining, by the forecast equation module, whether the estimated Box-Cox parameter is equal to the revised estimated Box-Cox parameter;
   f) upon the condition that the estimated Box-Cox parameter is not equal to the revised estimated Box-Cox parameter, replacing, by the forecast equation module, the estimated Box-Cox parameter with the revised estimated Box-Cox parameter and iterating back to step 4);
   g) upon the condition that the estimated Box-Cox parameter is equal to the revised estimated Box-Cox parameter, generating, by the forecast equation module, a transformed structural equation for the renewable energy forecast, where the transformed structural equation is based on the revised estimated Box-Cox parameter and with the eponents as determined by the multivariable fraction polynomial analysis;
   h) determining, by the forecast equation module, a plurality of time series variables associated with the transformed structural equation by performing a time series analysis of the transformed structural equation; and
   i) generating, by the forecast equation module, the transformed renewable energy forecast equation as a combination of the transformed structural equation and the plurality of time series variables;
  (2) calculating, by the one or more computers, a transformed renewable energy generation forecast using the transformed structural equation; and
  (3) calculating, by the one or more computers, an untransformed renewable energy generation forecast as the renewable energy generation forecast by applying the revised estimated Box-Cox parameter to the calculated transformed renewable energy generation forecast; and B) generating, by the one or more computers, control instructions based on the renewable energy generation forecast; and C) sending, by the one or more computers, the control instructions to one or more conventional or renewably energy sources within the electric power grid.

* * * * *